United States Patent
Chen et al.

(10) Patent No.: US 10,542,301 B2
(45) Date of Patent: Jan. 21, 2020

(54) MULTIMEDIA REDIRECTION METHOD, DEVICE, AND SYSTEM

(71) Applicant: Huawei Technologies Co., Ltd., Shenzhen (CN)

(72) Inventors: Chong Chen, Shenzhen (CN); Yanping Meng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 15/704,266

(22) Filed: Sep. 14, 2017

(65) Prior Publication Data

US 2018/0007400 A1   Jan. 4, 2018

Related U.S. Application Data

(63) Continuation of application No. PCT/CN2016/076634, filed on Mar. 17, 2016.

(30) Foreign Application Priority Data

Mar. 19, 2015   (CN) .......................... 2015 1 0124397

(51) Int. Cl.
*G06F 15/16* (2006.01)
*H04N 21/2343* (2011.01)
(Continued)

(52) U.S. Cl.
CPC ......... *H04N 21/2343* (2013.01); *H04N 19/42* (2014.11); *H04N 21/2408* (2013.01);
(Continued)

(58) Field of Classification Search
CPC .......... H04N 21/2225; H04L 29/08072; H04L 29/06
(Continued)

(56) References Cited

U.S. PATENT DOCUMENTS 9,380,091 B2 *   6/2016   Bao ....................... H04L 65/605
9,571,549 B2 *   2/2017   Bao ....................... H04L 65/605
(Continued)

FOREIGN PATENT DOCUMENTS

CN          102469131 A       5/2012
CN          103283250 A       9/2013
(Continued)

OTHER PUBLICATIONS

Machine Translation and Abstract of Chinese Publication No. CN104159150, Nov. 19, 2014, 13 pages.
(Continued)

*Primary Examiner* — Khanh Q Dinh
(74) *Attorney, Agent, or Firm* — Conley Rose, P.C.

(57) ABSTRACT

A multimedia redirection method comprising receiving, by a server, a hardware decoding capability sent by a client, where the hardware decoding capability is a hardware decoding capability that is in a video hardware acceleration specification and that is converted from a hardware decoding capability of a non-Windows operating system by the client; restoring, by the server, video data to a video code stream of a standard encoding format after receiving the hardware decoding capability; and sending, by the server, the video code stream to the client for decoding and display.

16 Claims, 10 Drawing Sheets

---

A server receives a hardware decoding capability sent by a client, where the hardware decoding capability is a hardware decoding capability that is in a video hardware acceleration DXVA specification and that is converted from a hardware decoding capability of a non-Windows operating system by the client — 101

The server restores video data to a video code stream of a standard encoding format after receiving the hardware decoding capability — 102

The server sends the video code stream to the client for decoding and display — 103

(51) Int. Cl.
*H04N 21/426* (2011.01)
*H04N 21/443* (2011.01)
*H04N 21/24* (2011.01)
*H04N 19/42* (2014.01)
*H04N 19/40* (2014.01)
*G06F 9/451* (2018.01)

(52) U.S. Cl.
CPC ..... *H04N 21/42607* (2013.01); *H04N 21/443* (2013.01); *G06F 9/452* (2018.02); *H04N 19/40* (2014.11)

(58) Field of Classification Search
USPC .............. 709/220, 224, 226, 228, 232
See application file for complete search history.

(56) References Cited

U.S. PATENT DOCUMENTS

| | | | | |
|---|---|---|---|---|
| 10,063,606 | B2* | 8/2018 | Bao | H04L 65/605 |
| 2002/0071493 | A1 | 6/2002 | Shirahama et al. | |
| 2003/0195998 | A1 | 10/2003 | Estrop | |
| 2008/0059921 | A1* | 3/2008 | Esliger | G06F 1/3203 |
| | | | | 716/136 |
| 2009/0150941 | A1* | 6/2009 | Riedl | H04N 7/173 |
| | | | | 725/61 |
| 2009/0174812 | A1 | 7/2009 | Hong | |
| 2010/0153758 | A1* | 6/2010 | Esliger | G06F 1/3203 |
| | | | | 713/320 |
| 2011/0129202 | A1* | 6/2011 | Soroushian | H04N 5/76 |
| | | | | 386/355 |
| 2012/0088584 | A1 | 4/2012 | Mamtani et al. | |
| 2012/0218292 | A1* | 8/2012 | Nyczyk | G06F 3/1462 |
| | | | | 345/629 |
| 2013/0204927 | A1 | 8/2013 | Kruglikov et al. | |
| 2014/0082146 | A1* | 3/2014 | Bao | H04L 65/605 |
| | | | | 709/219 |
| 2014/0173654 | A1* | 6/2014 | Riedl | G06Q 30/02 |
| | | | | 725/34 |
| 2014/0307785 | A1* | 10/2014 | Topiwala | H04N 19/164 |
| | | | | 375/240.07 |
| 2015/0215359 | A1* | 7/2015 | Bao | H04L 65/605 |
| | | | | 709/219 |
| 2016/0156942 | A1* | 6/2016 | Bao | H04L 65/605 |
| | | | | 725/116 |

FOREIGN PATENT DOCUMENTS

| | | |
|---|---|---|
| CN | 103873924 A | 6/2014 |
| CN | 104067627 A | 9/2014 |
| CN | 104159150 A | 11/2014 |
| CN | 104168486 A | 11/2014 |

OTHER PUBLICATIONS

Foreign Communication From a Counterpart Application, European Application No. 16764258.6, Extended European Search Report dated Nov. 8, 2017, 8 pages.
Machine Translation and Abstract of Chinese Publication No. CN102469131, May 23, 2012, 11 pages.
Machine Translation and Abstract of Chinese Publication No. CN103283250, Sep. 4, 2013, 26 pages.
Machine Translation and Abstract of Chinese Publication No. CN103873924, Jun. 18, 2014, 14 pages.
Machine Translation and Abstract of Chinese Publication No. CN104067627, Sep. 4, 2014, 25 pages.
"Series H: Audiovisual and Multimedia Systems, Infrastructure of audiovisual services—Coding of moving video, Advanced video coding for generic audiovisual services," ITU-T, H.264, Feb. 2014, 790 pages.
Foreign Communication From a Counterpart Application, PCT Application No. PCT/CN2016/076634, English Translation of International Search Report dated Jun. 23, 2016, 2 pages.
Foreign Communication From a Counterpart Application, PCT Application No. PCT/CN2016/076634, English Translation of Written Opinion dated Jun. 23, 2016, 5 pages.
Foreign Communication From a Counterpart Application, European Application No. 16764258.6, European Office Action dated Jul. 25, 2018, 5 pages.
Machine Translation and Abstract of Chinese Publication No. CN104168486, Nov. 26, 2014, 9 pages.
Foreign Communication From a Counterpart Application, Chinese Application No. 201510124397.X, Chinese Office Action dated Nov. 1, 2018, 6 pages.
Foreign Communication From a Counterpart Application, Chinese Application No. 201510124397.X, Chinese Office Action dated Mar. 20, 2018, 5 pages.

* cited by examiner

| SPS | PPS | I Frame | P Frame | B Frame | P Frame |

| Decoder initialization instruction | Video frame instruction | Rendering instruction | Video frame instruction | Rendering instruction | Video frame instruction | Rendering instruction | ... | Decoder destruction instruction |

FIG. 7

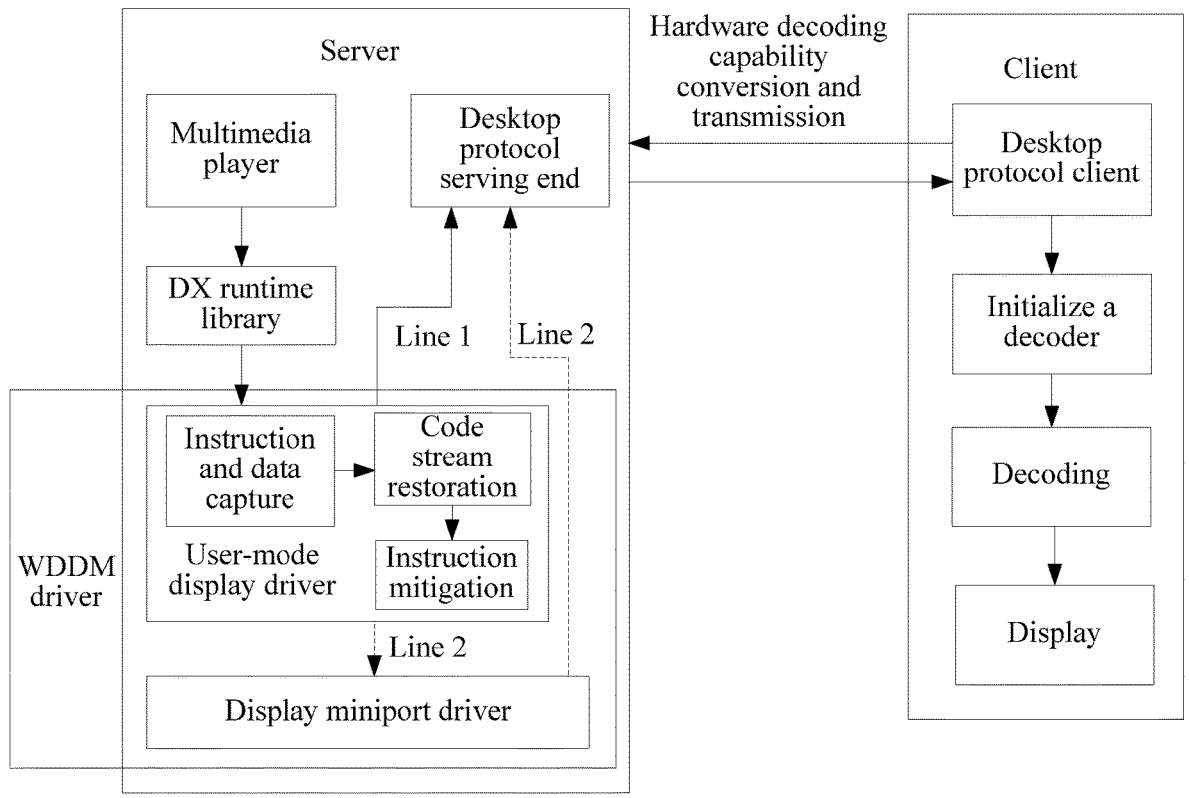

FIG. 9

A client converts a hardware decoding capability of the client into a hardware decoding capability in a video hardware acceleration DXVA specification, where the client includes a non-Windows operating system — 301

The client sends the hardware decoding capability in the DXVA specification to a server — 302

The client receives a video code stream that is of a standard encoding format and that is obtained by restoring video data by the server, and decodes and displays the video code stream — 303

FIG. 10

MULTIMEDIA REDIRECTION METHOD, DEVICE, AND SYSTEM

CROSS-REFERENCE TO RELATED APPLICATIONS

This application is a continuation of International Application No. PCT/CN2016/076634, filed on Mar. 17, 2016, which claims priority to Chinese Patent Application No. 201510124397.X, filed on Mar. 19, 2015, both of which are hereby incorporated by reference in their entireties.

TECHNICAL FIELD

Embodiments of the present disclosure relate to the field of multimedia technologies, and in particular, to a multimedia redirection method, a device, and a system.

BACKGROUND

In a remote desktop technology based on a virtual desktop infrastructure (VDI), a virtual desktop of a server may be remotely controlled using a local client, so as to perform operations such as remote screen display, remote sound transmission, and pluggable hardware mapping. When a multimedia file, such as a video file (video data of the video file may include various types of multimedia data such as a text, audio, visual media, and an animation), is played using the remote virtual desktop, the server usually performs software decoding on the video data using a central processing unit (CPU), transfers decoded video data to a display driver, and subsequently sends the decoded video data to the client for display. For the foregoing process, refer to FIG. 1. A desktop protocol serving end of the server organizes a network packet according to a desktop protocol, and sends the decoded video data to a desktop protocol client. In this way, because software decoding needs to be performed on the video data using the CPU of the server, usage of resources, such as the CPU and a memory of the server, is relatively high.

In the prior art, when a client based on a Windows® operating system sends a hardware decoding capability in a Microsoft® video hardware acceleration (DirectX Video Acceleration, DXVA) specification to a server based on a Windows operating system, the server may use the hardware decoding capability as a hardware decoding capability of the server. Because the client has the hardware decoding capability, the server may not perform software decoding on the video data using the CPU. Instead, the server may intercept the non-decoded video data using a Windows Display Driver Model (WDDM), and send the non-decoded video data to the desktop protocol client using the desktop protocol serving end for hardware decoding and display, so as to implement redirection of the video data. For this process, refer to FIG. 2. The redirection herein is that the server sends the non-decoded video data to the client for decoding and video playing. However, a redirection solution in the prior art is applicable only to a client based on a Windows operating system, but is not applicable to a client based on a non-Windows operating system such as Linux®, Android®, or iOS®.

SUMMARY

Embodiments of the present disclosure provide a multimedia redirection method, a device, and a system, so as to resolve a problem in the prior art that a multimedia redirection technology is not applicable to a client based on a non-Windows operating system.

To achieve the foregoing objective, the following technical solutions are used in the embodiments of the present disclosure.

According to a first aspect, a multimedia redirection method is provided, including receiving, by a server, a hardware decoding capability sent by a client, where the hardware decoding capability is a hardware decoding capability that is in a video hardware acceleration DXVA specification and that is converted from a hardware decoding capability of a non-Windows operating system by the client; restoring, by the server, video data to a video code stream of a standard encoding format after receiving the hardware decoding capability; and sending, by the server, the video code stream to the client for decoding and display.

With reference to the first aspect, in a first possible implementation of the first aspect, the hardware decoding capability in the DXVA specification is at a video bitstream processing VLD level.

With reference to the first aspect, in a second possible implementation of the first aspect, the restoring video data to a video code stream of a standard encoding format includes obtaining, by the server from an image buffer, decoding parameter information needed to decode the video data, where the decoding parameter information includes a specification, a profile level, and video resolution that correspond to a code stream of the video data, and obtaining a video frame sequence of the video data from the code stream buffer; filling, by the server, the decoding parameter information into a structure corresponding to the standard encoding format; and synthesizing, by the server, the video frame sequence with the decoding parameter information in the structure corresponding to the standard encoding format to obtain the video code stream of the standard encoding format.

With reference to the second possible implementation of the first aspect, in a third possible implementation of the first aspect, the sending, by the server, the video code stream to the client for decoding and display includes sending, by the server, a video frame instruction to the client, where the video frame instruction includes the decoding parameter information in the structure corresponding to the standard encoding format and a video frame of the video frame sequence; and sending, by the server, a rendering instruction corresponding to the video frame instruction to the client, where the rendering instruction includes an identifier of the video frame and a display area.

With reference to any one of the first aspect to the third possible implementation of the first aspect, in a fourth possible implementation of the first aspect, before the restoring, by the server, video data to a video code stream of a standard encoding format, the method further includes constructing, by the server, a decoder initialization instruction according to a type of a decoder that needs to be created by the client; and sending, by the server, the decoder initialization instruction to the client, where the decoder initialization instruction is used to instruct the client to initialize, according to the decoder initialization instruction, the decoder of the client, to wait to receive the video frame.

With reference to the fourth possible implementation of the first aspect, in a fifth possible implementation of the first aspect, the method further includes sending, by the server, a decoder destruction instruction to the client after finishing sending the video frame, where the decoder destruction instruction is used to instruct the client to destruct the decoder.

According to a second aspect, a multimedia redirection method is provided, including converting, by a client, a hardware decoding capability of the client into a hardware decoding capability in a video hardware acceleration DXVA specification, where the client includes a non-Windows operating system; sending, by the client, the hardware decoding capability in the DXVA specification to a server; and receiving, by the client, a video code stream that is of a standard encoding format and that is obtained by restoring video data by the server, and decoding and displaying the video code stream.

With reference to the second aspect, in a first possible implementation of the second aspect, the converting, by a client, a hardware decoding capability of the client into a hardware decoding capability in a video hardware acceleration DXVA specification includes filling, by the client according to a format of a hardware decoding capability at a video bitstream processing VLD level in the DXVA specification, the hardware decoding capability into a structure that describes the hardware decoding capability and that is defined in the DXVA specification.

With reference to the second aspect, in a second possible implementation of the second aspect, the receiving, by the client, a video code stream that is of a standard encoding format and that is obtained by restoring video data by the server, and decoding and displaying the video code stream includes receiving, by the client, a video frame instruction sent by the server, where the video frame instruction includes decoding parameter information in a structure corresponding to the standard encoding format and a video frame of the video frame sequence, and the decoding parameter information in the structure corresponding to the standard encoding format includes a specification, a profile level, and video resolution that correspond to a code stream of the video data; receiving, by the client, a rendering instruction that is corresponding to the video frame instruction and that is sent by the server, where the rendering instruction includes an identifier of the video frame and a display area; and decoding and displaying, by the client, the video code stream according to the video frame instruction and the rendering instruction.

With reference to any one of the second aspect to the second possible implementation of the second aspect, in a third possible implementation of the second aspect, the method further includes receiving, by the client before receiving the video code stream, a decoder initialization instruction sent by the server, where the decoder initialization instruction is used to instruct the client to initialize, according to the decoder initialization instruction, a decoder of the client; and receiving, by the client after finishing decoding, a decoder destruction instruction sent by the server, where the decoder destruction instruction is used to instruct the client to destruct the decoder.

According to a third aspect, a server is provided, including a receiving unit configured to receive a hardware decoding capability sent by a client, where the hardware decoding capability is a hardware decoding capability that is in a video hardware acceleration DXVA specification and that is converted from a hardware decoding capability of a non-Windows operating system by the client; a restoration unit configured to restore video data to a video code stream of a standard encoding format after the receiving unit receives the hardware decoding capability; and a sending unit configured to send the video code stream to the client for decoding and display.

With reference to the third aspect, in a first possible implementation of the third aspect, the hardware decoding capability in the DXVA specification is at a video bitstream processing VLD level.

With reference to the third aspect, in a second possible implementation of the third aspect, the restoration unit is configured to obtain, from an image buffer, decoding parameter information needed to decode the video data, where the decoding parameter information includes a specification, a profile level, and video resolution that correspond to a code stream of the video data, and obtain a video frame sequence of the video data from the code stream buffer; fill the decoding parameter information into a structure corresponding to the standard encoding format; and synthesize the video frame sequence with the decoding parameter information in the structure corresponding to the standard encoding format to obtain the video code stream of the standard encoding format.

With reference to the second possible implementation of the third aspect, in a third possible implementation of the third aspect, the sending unit is configured to send a video frame instruction to the client, where the video frame instruction includes the decoding parameter information in the structure corresponding to the standard encoding format and a video frame of the video frame sequence; and send a rendering instruction corresponding to the video frame instruction to the client, where the rendering instruction includes an identifier of the video frame and a display area.

With reference to any one of the third aspect to the third possible implementation of the third aspect, in a fourth possible implementation of the third aspect, the server further includes a construction unit configured to construct a decoder initialization instruction according to a type of a decoder that needs to be created by the client, where the sending unit is further configured to send the decoder initialization instruction to the client, where the decoder initialization instruction is used to instruct the client to initialize, according to the decoder initialization instruction, the decoder of the client, to wait to receive the video frame.

With reference to the fourth possible implementation of the third aspect, in a fifth possible implementation of the third aspect, the sending unit is further configured to send a decoder destruction instruction to the client after finishing sending the video frame, where the decoder destruction instruction is used to instruct the client to destruct the decoder.

According to a fourth aspect, a client is provided, including a processing unit configured to convert a hardware decoding capability of the client into a hardware decoding capability in a video hardware acceleration DXVA specification, where the client includes a non-Windows operating system; a sending unit configured to send the hardware decoding capability in the DXVA specification to a server; and a receiving unit configured to receive a video code stream that is of a standard encoding format and that is obtained by restoring video data by the server, where the processing unit is further configured to decode and display the video code stream received by the receiving unit.

With reference to the fourth aspect, in a first possible implementation of the fourth aspect, the processing unit is configured to fill, according to a format of a hardware decoding capability at a video bitstream processing variable length decoder (VLD) level in the DXVA specification, the hardware decoding capability into a structure that describes the hardware decoding capability and that is defined in the DXVA specification.

With reference to the fourth aspect, in a second possible implementation of the fourth aspect, the receiving unit is configured to receive a video frame instruction sent by the server, where the video frame instruction includes decoding parameter information in a structure corresponding to the standard encoding format and a video frame of the video frame sequence, and the decoding parameter information in the structure corresponding to the standard encoding format includes a specification, a profile level, and video resolution that correspond to a code stream of the video data; and receive a rendering instruction that is corresponding to the video frame instruction and that is sent by the server, where the rendering instruction includes an identifier of the video frame and a display area; and the processing unit is configured to decode and display the video code stream according to the video frame instruction and the rendering instruction that are received by the receiving unit.

With reference to any one of the fourth aspect to the second possible implementation of the fourth aspect, in a third possible implementation of the fourth aspect, the receiving unit is further configured to, before receiving the video code stream, receive a decoder initialization instruction sent by the server, where the decoder initialization instruction is used to instruct the client to initialize, according to the decoder initialization instruction, a decoder of the client; and after finishing decoding, receive a decoder destruction instruction sent by the server, where the decoder destruction instruction is used to instruct the client to destruct the decoder.

According to a fifth aspect, a system is provided, including the server described in the third aspect and the client described in the fourth aspect.

The embodiments of the present disclosure provide the multimedia redirection method, the device, and the system. The client based on the non-Windows operating system converts the hardware decoding capability of the client into the hardware decoding capability that is in the DXVA specification and that can be recognized by the server based on a Windows operating system, and sends the hardware decoding capability to the server. The server uses the hardware decoding capability as a hardware decoding capability of the server, and therefore, does not perform software decoding on the video data. Instead, the server restores the non-decoded video data to the video code stream of the standard encoding format, and sends the video code stream to the client actually having the hardware decoding capability, so that the client based on the non-Windows operating system can also decode and display the video code stream of the standard encoding format to implement multimedia redirection. Therefore, the problem in the prior art that the multimedia redirection technology is not applicable to the client based on the non-Windows operating system is resolved.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show merely some embodiments of the present disclosure, and persons of ordinary skill in the art may still derive other drawings from these accompanying drawings without creative efforts.

FIG. 7 is a sequence of mitigated instructions sent by a server to a client according to an embodiment of the present disclosure;

FIG. 9 is a schematic diagram of interaction between a server and a client according to an embodiment of the present disclosure;

FIG. 10 is a flowchart of a multimedia redirection method according to another embodiment of the present disclosure;

DESCRIPTION OF EMBODIMENTS

Figure 1:
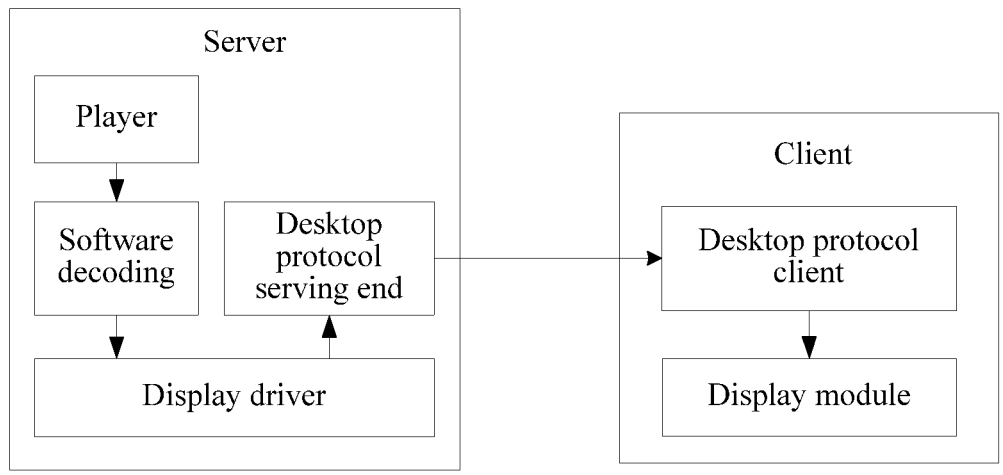
FIG. 1 is a schematic interaction diagram showing that a client remotely controls a server to play a video in the prior art.
Figure 2:
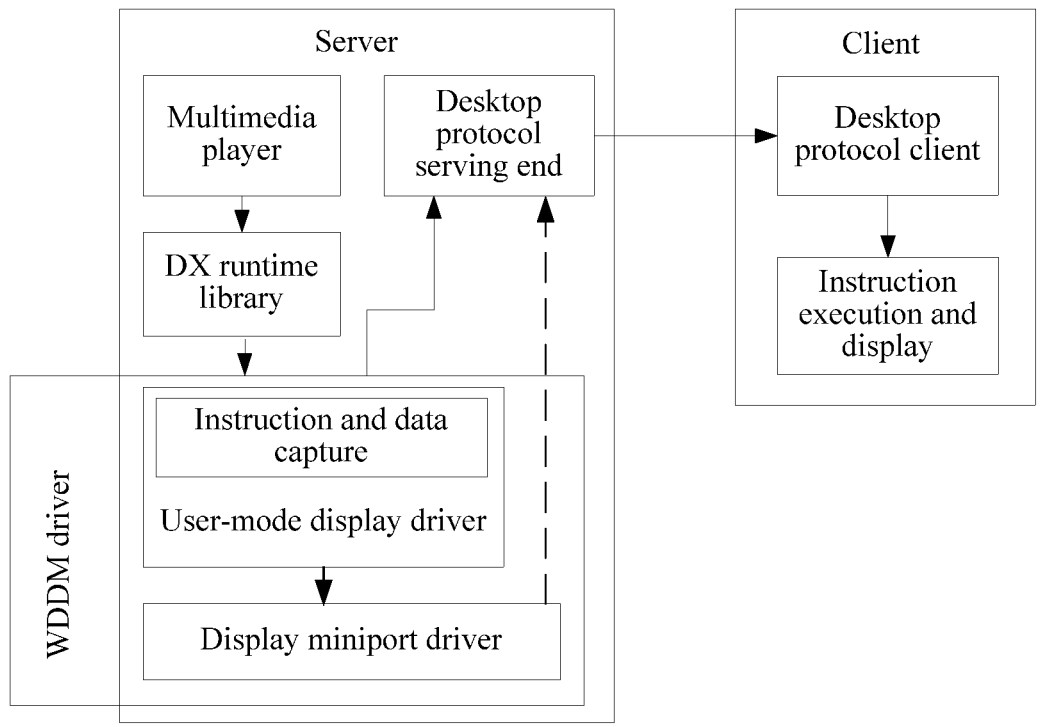
FIG. 2 is a schematic interaction diagram showing that a client and a server that are based on a Windows operating system perform multimedia redirection in the prior art.

The following clearly describes the technical solutions in the embodiments of the present disclosure with reference to the accompanying drawings in the embodiments of the present disclosure.

In a VDI-based remote desktop technology, remote screen display, remote video play, and the like are implemented by virtualizing a desktop of a server that runs a Windows operating system and connecting a client to a virtual desktop of the server, rather than by configuring, for each client, a physical desktop running a Windows operating system. Accessing the remote virtual desktop by the client is similar to accessing a conventional local desktop. The virtual desktop of the server is usually implemented in two manners: running several Windows virtual machines (VM) on the server, and connecting clients to the VMs in a one-to-one manner, where the VM is a complete computer system that runs in an isolated environment, that is simulated using software, and that has a complete hardware system function; and disposing Windows blades on the server to form several blade servers, and connecting clients to the blade servers in a one-to-one manner. The first implementation is used as an example for description in the embodiments of the present disclosure.

When a video file is remotely played, video data may be decoded using two solutions: a solution in which a CPU performs software decoding and a solution in which a hardware module performs hardware decoding. For example, hardware decoding may be performed using a graphic processing unit (GPU) provided by a graphic chip vendor. Therefore, a software algorithm is replaced with a hardware module, so that video hardware acceleration is achieved by fully using a rapidness characteristic inherent in hardware, and video performance of a computer is enhanced. The GPU is usually a core component of a graphics card.

A DXVA specification is a custom video acceleration specification of Microsoft. In the DXVA specification, four hardware decoding capability levels of the GPU are stipulated: a video bitstream processing VLD level, an intra-frame compression IDC level, an inter-frame compression MoComp level, and a post-processing PostProc level. The VLD level is the highest level of a hardware decoding capability, and may include an IDCT-level hardware decoding capability, a MoComp-level hardware decoding capability, and a PostProc-level hardware decoding capability. A GPU having the VLD-level hardware decoding capability may parse a non-decoded video data stream, and then perform processing such as IDCT, MoComp, and PostProc, to implement hardware decoding. However, if a GPU has the IDCT-level, MoComp-level, or PostProc-level hardware decoding capability, first, a CPU needs to parse a non-decoded video data stream to obtain several macroblocks, and then the GPU performs corresponding decoding processing on the macroblocks. Therefore, the GPU having the VLD-level hardware decoding capability may directly perform decoding processing on the non-decoded video data stream. Hardware decoding capabilities of clients based on Microsoft Windows operating systems may be classified into the foregoing four levels.

Before a video file is played, video data in the video file is a video code stream of a standard encoding format. The standard encoding format herein may be an encoding format stipulated in a video coding standard, for example, may include a standard encoding format stipulated in the highly compressed digital video codec standard H.264 proposed by the Joint Video Team (JVT) including the Video Coding Experts Group (VCEG) and the Moving Picture Experts Group (MPEG), a standard encoding format stipulated in the compression standard MPEG-2 that is established by the MPEG and that is based on digital storage of media moving pictures and audio, a standard encoding format stipulated in Video Codec 1 (VC-1) developed by Microsoft, a standard encoding format stipulated in an audio video coding standard (AVS), and various other types of standard encoding formats. In the embodiments of the present disclosure, that the video code stream of the standard encoding format in the video file is of the H.264 standard encoding format (that is, the standard encoding format stipulated in H.264) is used as an example for description. After the video file begins to be played, in the prior art, a server parses the video code stream of the standard encoding format. An application program, such as a player, inputs, according to an interface provided by a multimedia programming interface (Direct eXtension, DX) runtime library, a corresponding parameter for interface invocation. Video data finally invoked to a WDDM driver and sent to the client is not the video code stream of the standard encoding format.

In descriptions of the following embodiments of this application, a client based on a non-Windows operating system is connected, using a VDI-based remote desktop technology, to a server based on a Windows operating system, to play a remote multimedia file. The client may remotely log on to a virtual machine running in the server, and perform multimedia redirection using components, such as a WDDM, a player, a DX runtime library, and a desktop protocol serving end, in the virtual machine, to remotely play the multimedia file.

Figure 3:
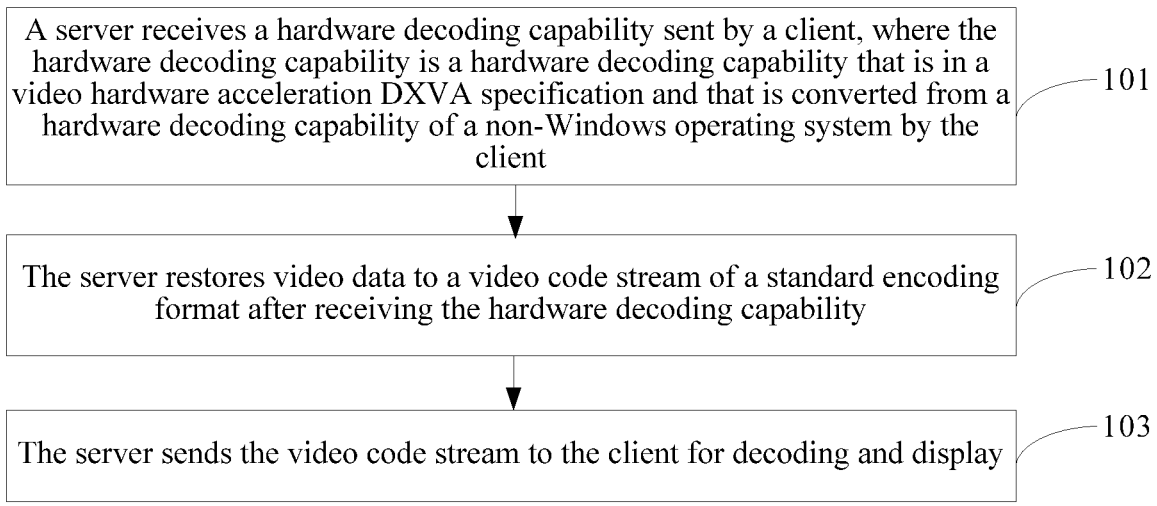
FIG. 3 is a flowchart of a multimedia redirection method according to an embodiment of the present disclosure.

Referring to FIG. 3, an embodiment of the present disclosure provides a multimedia redirection method. The method may include the following main steps.

101. A server receives a hardware decoding capability sent by a client, where the hardware decoding capability is a hardware decoding capability that is in a video hardware acceleration DXVA specification and that is converted from a hardware decoding capability of a non-Windows operating system by the client.

102. The server restores video data to a video code stream of a standard encoding format after receiving the hardware decoding capability.

103. The server sends the video code stream to the client for decoding and display.

In step 101, the server may be a server based on a Windows operating system, and may recognize a hardware decoding capability in the DXVA specification. The client may be a client based on a non-Windows operating system. The hardware decoding capability of the client is not a hardware decoding capability in the DXVA specification. After the client converts the hardware decoding capability of the non-Windows operating system into the hardware decoding capability in the video hardware acceleration DXVA specification, the hardware decoding capability can be recognized by a virtual machine based on a Windows operating system. For a client that is based on a Windows operating system and that has a hardware decoding capability in the DXVA specification, the virtual machine in the server based on the Windows operating system may recognize the hardware decoding capability in the DXVA specification of the client. Therefore, the hardware decoding capability in the DXVA specification may be directly sent to the virtual machine without conversion. This is consistent with the prior art. All clients in this embodiment of the present disclosure are clients based on non-Windows operating systems unless otherwise specified.

Optionally, the hardware decoding capability in the DXVA specification is at a video bitstream processing VLD level.

Optionally, in step 102, the restoring video data to a video code stream of a standard encoding format may include obtaining, by the server from an image buffer, decoding parameter information needed to decode the video data, where the decoding parameter information includes a specification, a profile level, and video resolution that correspond to a code stream of the video data, and obtaining a video frame sequence of the video data from a code stream buffer; filling, by the server, the decoding parameter information into a structure corresponding to the standard encoding format; and synthesizing, by the server, the video frame sequence with the decoding parameter information in the structure corresponding to the standard encoding format to obtain the video code stream of the standard encoding format, where the server may fill, according to an algorithm specified in a video coding standard corresponding to the standard encoding format, the decoding parameter information into the structure corresponding to the standard encoding format.

Optionally, in step 103, that the server sends the video code stream to the client for decoding and display may include sending, by the server, a video frame instruction to the client, where the video frame instruction includes the decoding parameter information in the structure corresponding to the standard encoding format and a video frame of the video frame sequence; and sending, by the server, a rendering instruction corresponding to the video frame instruction to the client, where the rendering instruction includes an identifier of the video frame and a display area.

Optionally, before step 102, the method may further include constructing, by the server according to a type of a decoder that needs to be created by the client and the decoding parameter information, a decoder initialization instruction; and sending, by the server, the decoder initialization instruction to the client, where the decoder initialization instruction is used to instruct the client to initialize, according to the decoder initialization instruction, the decoder of the client, to wait to receive the video frame.

Optionally, the method may further include sending, by the server, a decoder destruction instruction to the client after finishing sending the video frame, where the decoder destruction instruction is used to instruct the client to destruct the decoder.

It should be noted that in this embodiment of the present disclosure, when the client logs, using a VDI-based remote desktop technology, on to the server based on the Windows operating system to play a multimedia file, the client may remotely log on to the virtual machine running in the server to remotely play the multimedia file.

This embodiment of the present disclosure provides the multimedia redirection method. When the multimedia file is remotely played using the VDI-based remote desktop technology, after receiving the hardware decoding capability that is in the DXVA specification, that is converted from the hardware decoding capability of the non-Windows operating system, and that is sent by the client based on the non-Windows operating system, the server based on the Windows operating system may recognize the hardware decoding capability in the DXVA specification, use the hardware decoding capability in the DXVA specification as a hardware decoding capability of the server, and therefore, not perform software decoding on the video data. Instead, the server restores the non-decoded video data to the video code stream of the standard encoding format, and sends the video code stream to the client actually having the hardware decoding capability, so that the client based on the non-Windows operating system can also decode and display the video code stream of the standard encoding format to implement multimedia redirection. Therefore, a problem in the prior art that a multimedia redirection technology is not applicable to the client based on the non-Windows operating system is resolved.

Figure 4:
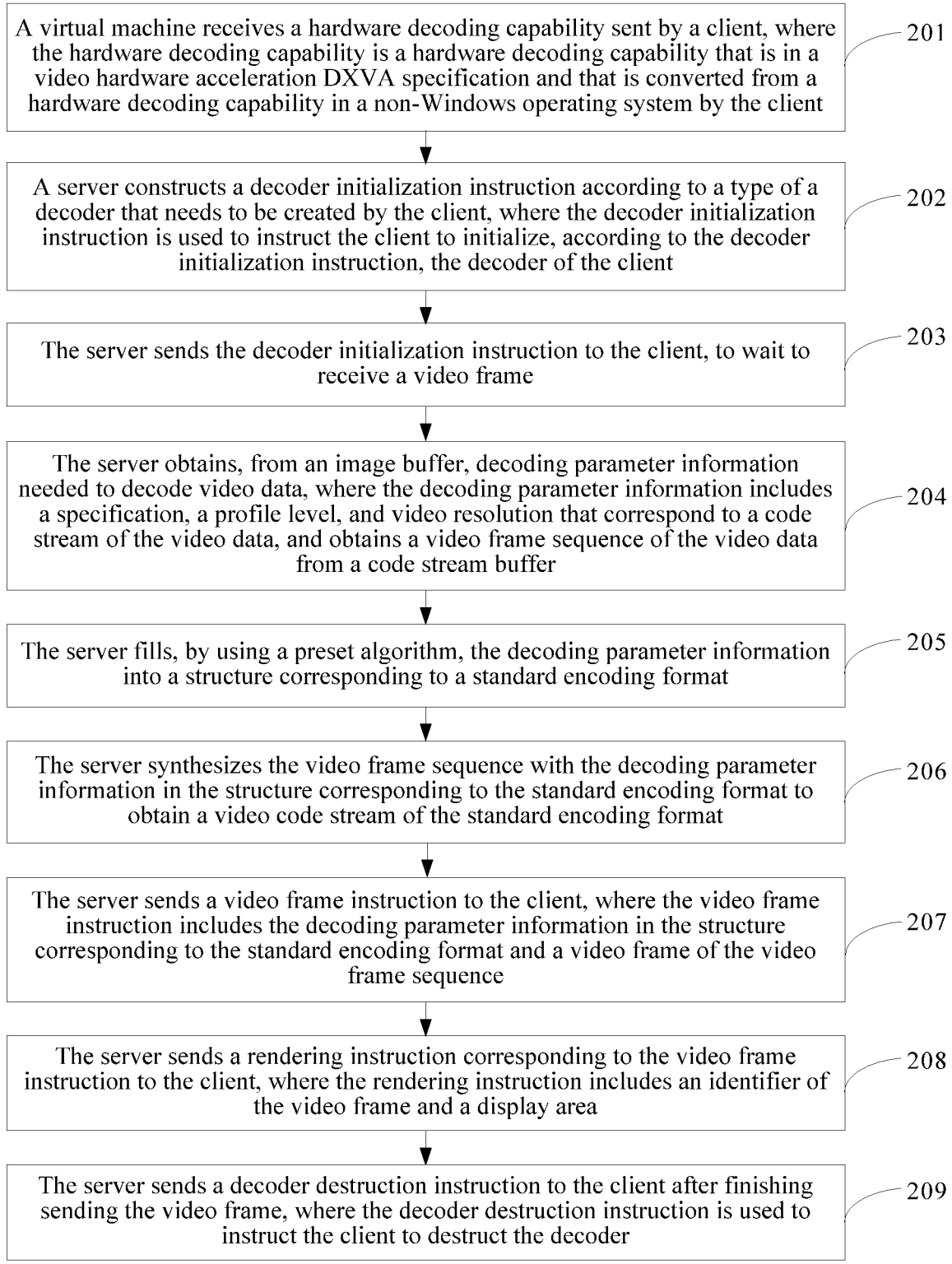
FIG. 4 is a flowchart of a multimedia redirection method according to another embodiment of the present disclosure.

Referring to FIG. 4, in an embodiment of the present disclosure, an example in which a virtual machine in a server based on a Windows operating system is connected to a client to perform multimedia redirection is used for detailed description. This embodiment may include the following main steps.

201. A server receives a hardware decoding capability sent by a client, where the hardware decoding capability is a hardware decoding capability that is in a video hardware acceleration DXVA specification and that is converted from a hardware decoding capability of a non-Windows operating system by the client.

In a VDI-based remote desktop technology, the client may remotely log on to a virtual machine running in the server based on the Windows operating system to remotely play a multimedia file. The virtual machine may recognize the hardware decoding capability in the DXVA specification. The client herein may be a client based on a non-Windows operating system. The hardware decoding capability of the client is not a hardware decoding capability in the DXVA specification. After the client converts the hardware decoding capability of the non-Windows operating system into the hardware decoding capability in the video hardware acceleration DXVA specification, the hardware decoding capability can be recognized by the virtual machine based on the Windows operating system. All clients in this embodiment of the present disclosure are clients based on non-Windows operating systems unless otherwise specified.

Optionally, in step 201, the hardware decoding capability that is in the DXVA specification and that is obtained after the conversion is at a video bitstream processing VLD level. The client based on the non-Windows operating system may be classified into two types: a client that has the hardware decoding capability and a client that does not have the hardware decoding capability, and the client does not have four levels of hardware decoding capabilities similar to those in the DXVA specification. When the client based on the non-Widows operating system does not have the hardware decoding capability, the client cannot decode a video bitstream of non-decoded video data. When the client has the hardware decoding capability, the client can decode a video bitstream of non-decoded video data. The hardware decoding capability may correspond to a VLD-level hardware decoding capability in the DXVA specification. Therefore, the client may convert the hardware decoding capability of the client into the VLD-level hardware decoding capability in the DXVA specification.

For example, when a system is initialized, the client based on the non-Windows operating system may detect, according to a hardware parameter of an internal GPU, whether the client has the hardware decoding capability and a decoder type that can be supported by the client or another hardware decoding capability parameter. The decoder type may be a hardware decoding format supported in the DXVA specification, for example, a decoder that supports hardware decoding on a video code stream of an H.264 or MPEG-2 standard encoding format. The client may fill, according to the hardware decoding capability at the video bitstream processing VLD level in the DXVA specification, the hardware decoding capability of the client into a structure that describes the hardware decoding capability and that is defined in the DXVA specification, to convert the hardware decoding capability of the client into the VLD-level hardware decoding capability in the DXVA specification. The structure that describes the hardware decoding capability and that is defined in the DXVA specification may include a globally unique identifier (GUID), and a structure body for describing specific parameter information of the hardware decoding capability, for example, a DXVA2_ConfigPictureDecode structure and a DXVA2_VideoProcessorCaps structure. The GUID may be used to identify a hardware decoding capability level, a supported decoder type, and the like. Subsequently, the client may encapsulate the GUID, the structure, and the like for describing the hardware decoding capability in the structure that describes the hardware decoding capability and that is defined in the DXVA specification, send the encapsulated GUID, the structure, and the like to a virtual machine, and store the encapsulate GUID, the structure, and the like in a storage area in the server.

Alternatively, the client may copy data in a corresponding structure, which describes the hardware capability and is defined in the DXVA specification, of a client that supports the same decoder type, that has the VLD-level hardware decoding capability, and that is based on a Windows operating system, send the data to the virtual machine, and store the data. Certainly, the hardware decoding capability of the client may be converted into the hardware decoding capability in the DXVA specification in another manner and sent to the virtual machine. A specific implementation is not limited in this embodiment of the present disclosure.

When the client remotely controls the virtual machine to play a video, a DX runtime library queries, using a pfnGetCaps function registered by a user-mode display driver of a WDDM during initialization, a hardware decoding capability represented by data in a storage area of the server. The WDDM driver feeds back the hardware decoding capability to the DX runtime library, and lies that the virtual machine has a corresponding hardware decoding capability. An application program, such as a player, considers that the virtual machine has the hardware decoding capability. Therefore, the server may not perform software decoding on video data using a CPU. In this case, the server may create a decoding device to create a resource, such as a buffer (for example, an image buffer or a code stream buffer), needed in decoding, and obtain decoding parameter information and a video frame sequence of the video data. However, because the server actually does not have the hardware decoding capability, the server does not create a decoder configured to perform hardware decoding. Instead, hardware decoding and display need to be performed using a decoder created by the client actually having the hardware decoding capability. For a structural model diagram of the WDDM, refer to FIG. 5. A WDDM model may be mainly classified into a user-mode display driver and a kernel-mode display driver. It should be noted that the virtual machine is not a physical machine. Therefore, components in a WDDM of the virtual machine may not be physical components, but may be components that can be implemented using software.

It should be noted that a type of the decoder that needs to be created by the client is consistent with a standard encoding format of a non-decoded video code stream of the standard encoding format in a video file before a video is played. In this embodiment of the present disclosure, when the non-decoded video code stream is of an H.264 standard encoding format, the type of the decoder that needs to be created by the client is a decoder that supports the H.264 standard encoding format, and the decoder may decode a video code stream of the H.264 standard encoding format.

202. The server constructs a decoder initialization instruction according to a type of a decoder that needs to be created by the client, where the decoder initialization instruction is used to instruct the client to initialize, according to the decoder initialization instruction, the decoder of the client.

The virtual machine in the server may create a decoding device using the DX runtime library and a pfnCreateDecodeDevice interface provided by the WDDM, create, using a pfnCreateResource function, the buffer needed in decoding, and then construct the decoder initialization instruction according to the type of the decoder that needs to be created by the client. The decoder initialization instruction may include parameter information that is needed in decoder initialization, for example, the type of the decoder, and a length value and a width value of the video. The decoder initialization instruction may be used to instruct the client to initialize, according to the decoder initialization instruction, the decoder of the client.

It should be noted that compared with the prior art, the decoder initialization instruction constructed herein for instructing the client (that is, the client based on the non-Windows operating system) to initialize, according to the decoder initialization instruction, the decoder of the client is a mitigated instruction. In the prior art, the server needs to send a group of instructions, for example, multiple instructions such as a CreateDevice instruction, a DestroyDevice instruction, a CreateDecodeDevice instruction, a DestroyDecodeDevice instruction, a CreateResource instruction, a DestroyResource instruction, a CreateVideoProcessDevice instruction, and a Destroy VideoProcessDevice instruction, to a client based on a Windows operating system, to instruct the client based on the Windows operating system to initialize, according to the foregoing multiple instructions, a decoder of the client. In the prior art, any one of the multiple instructions needs to carry header information and is sent to the client after being assembled into a network packet. In this embodiment of the present disclosure, the multiple instructions in the prior art are mitigated to one decoder initialization instruction, and the decoder initialization instruction is sent to the client after being assembled into a network packet. Therefore, a quantity of instructions sent by the server to the client may be reduced, thereby saving bandwidth.

203. The server sends the decoder initialization instruction to the client, to wait to receive a video frame.

In the prior art, the client based on the Windows operating system usually invokes a decoder initialization interface (InitializeDecoder interface) when receiving the last instruction in the group of instructions that are used to instruct the client to initialize the decoder, so as to initialize the decoder. In this step, after constructing the decoder initialization instruction, the virtual machine in the server assembles a network packet according to a desktop protocol, and sends the decoder initialization instruction to the client. After receiving the decoder initialization instruction sent by the server, the client invokes the decoder initialization interface of the client, to initialize the decoder according to a parameter carried in the decoder initialization instruction, so as to wait to receive the video frame that is sent by the server in step 204 and decode the video frame. The decoder initialization instruction in this embodiment of the present disclosure is a general decoder initialization instruction rather than an initialization instruction in a Windows operating system specification. After receiving the initialization instruction in this embodiment of the present disclosure, a client based on any operating system may invoke a decoder initialization interface of the client to initialize the decoder. Therefore, the client based on the non-Windows operating system can initialize the decoder in a multimedia redirection process to perform hardware decoding on the video data.

For example, in this embodiment of the present disclosure, if the non-decoded video code stream of the standard encoding format in the video file is of the H.264 standard encoding format, the type of the decoder initialized by the client according to the constructed decoder initialization instruction is a decoder supporting the H.264 standard encoding format. This type of decoder may decode the video code stream that is encoded using the H.264 standard encoding format. After receiving the decoder initialization instruction, the client invokes an initialization interface provided by a hardware chip vendor, so as to initialize the decoder.

204. The server obtains, from an image buffer, decoding parameter information needed to decode video data, where the decoding parameter information includes a specification, a profile level, and video resolution that correspond to a code stream of the video data, and obtains a video frame sequence of the video data from a code stream buffer.

The WDDM of the virtual machine in the server provides a pfnDecodeExecute interface for an application layer to which an application program, such as a player, belongs. When invoking the pfnDecodeExecute interface, the application layer fills the image buffer and the code stream buffer. The image buffer and the code stream buffer are buffers created by a CreateResource interface in the user-mode display driver. The application layer first invokes a GetBuffer interface to obtain addresses of the buffers, and then copies the non-decoded video data to the buffers for storage. According to the addresses of the image buffer and the code stream buffer, the user-mode display driver may obtain, from the image buffer, the decoding parameter information needed to decode the video data, where the decoding parameter information includes the specification, the profile level, and the video resolution that correspond to the code stream of the video data, and obtain the video frame sequence of the video data from the code stream buffer.

After the video file begins to be played, the server parses the video code stream of the standard encoding format. An application program, such as a player, inputs, according to an interface provided by a multimedia programming interface (Direct eXtension, DX) runtime library, a corresponding parameter for interface invocation. The video data finally invoked to the WDDM driver and sent to the client is not the video code stream of the standard encoding format. Therefore, the video data stored in the image buffer and the code stream buffer is not the video code stream of the standard encoding format.

205. The server fills the decoding parameter information into a structure corresponding to a standard encoding format.

The virtual machine in the server may restore the video data to the video code stream of the standard encoding format according to the data obtained from the image buffer and the code stream buffer. The virtual machine may fill, according to an algorithm specified in a video coding standard corresponding to the standard encoding format, the decoding parameter information obtained from the image buffer into the structure corresponding to the standard encoding format.

Figures 5, 6:
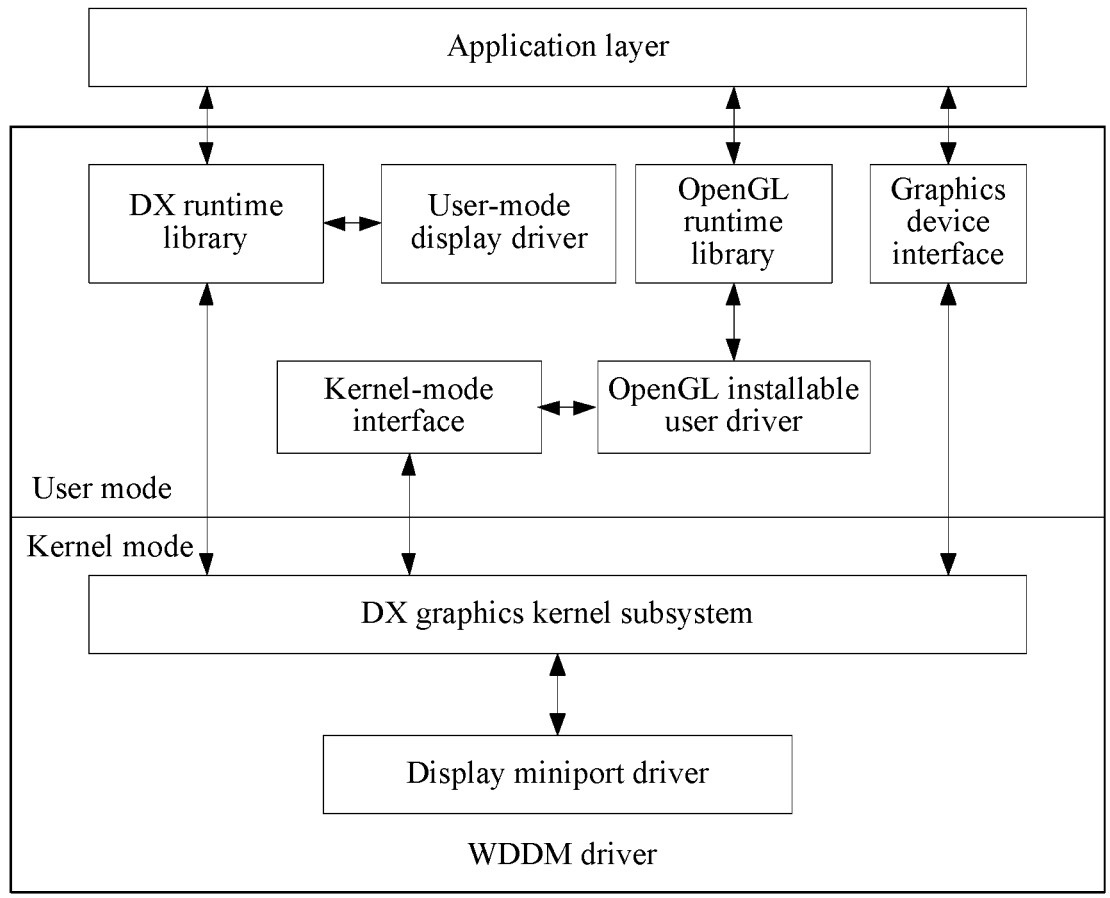
FIG. 5 is a schematic structural model diagram of a WDDM in the prior art.
FIG. 6 is a schematic structural diagram of a code stream of an H.264 standard encoding format according to an embodiment of the present disclosure.

Using the H.264 standard encoding format as an example, as shown in FIG. 6, the video code stream of the H.264 standard encoding format may include an SPS, a PPS, and a video frame sequence: I Frame, P Frame, and B Frame. The SPS and the PPS are structures that correspond to the H.264 standard encoding format and into which the decoding parameter information is filled, for example, the specification (profile), the profile level (level), and the video resolution that correspond to the code stream of the video data. The virtual machine may fill, into a DXVA_PictureParameters structure, the decoding parameter information in the image buffer of the WDDM, and then convert the DXVA_PictureParameters structure into a seq_parameter_set_rbsp structure (SPS) and a pic_parameter_set_rbsp structure (PPS) according to an algorithm specified in an H.264 highly compressed digital video codec standard corresponding to the H.264 standard encoding format, to fill the decoding parameter information in the image buffer into the SPS and the PPS of the H.264 standard encoding format.

206. The server synthesizes the video frame sequence with the decoding parameter information in the structure corresponding to the standard encoding format to obtain a video code stream of the standard encoding format.

Using the H.264 standard encoding format as an example, the virtual machine in the server may synthesize the video frame sequence I Frame, P Frame, and B Frame with the decoding parameter information that is stored in the SPS and the PPS of the H.264 standard encoding format, to obtain the video code stream of the standard encoding format.

It should be noted that the video data in the video file is the video code stream of the standard encoding format before the video is played. After the video begins to be played, the virtual machine performs related processing such as parsing, so that the video data is not the video code stream of the standard encoding format. The video data becomes the video code stream of the standard encoding format again using step 205 and step 206. That is, the video data is restored to the video code stream of the standard encoding format using step 205 and step 206.

Certainly, if the video data in the video file is a video code stream of MPEG-2, VC-1, AVS, or another standard encoding format before the video is played, the video data in the image buffer and the code stream buffer may also be restored to the video code stream of the standard encoding format. Details are not described herein.

It should be noted that the video code stream of a general standard encoding format is obtained in this step. Therefore, not only a client based on a Windows operating system but also a client based on a non-Windows operating system can recognize the video code stream so as to decode and display the video code stream. Therefore, a problem in the prior art that a multimedia redirection technology is not applicable to the client based on the non-Windows operating system is resolved.

207. The server sends a video frame instruction to the client, where the video frame instruction includes the decoding parameter information in the structure corresponding to the standard encoding format and a video frame of the video frame sequence.

After obtaining the video code stream of the standard encoding format, the virtual machine in the server assembles, into a network packet according to the desktop protocol, the video frame instruction that includes the video frame and the decoding parameter information in the structure corresponding to the standard encoding format, and sends the network packet to the client, so that the client performs hardware decoding on the video frame in the video code stream of the standard encoding format according to the decoding parameter information corresponding to the standard encoding format, and then displays the video frame after video post-processing.

Certainly, the server may alternatively add, to a video frame instruction sent in the first time, the decoding parameter information in the structure corresponding to the standard encoding format and the video frame of the video frame sequence. A subsequently sent video frame instruction does not carry the decoding parameter information in the structure corresponding to the standard encoding format, but carries only the video frame of the video frame sequence. The client decodes the video code stream according to the decoding parameter information that is in the structure corresponding to the standard encoding format and that is received in the first time. This is not limited in this embodiment of the present disclosure.

208. The server sends a rendering instruction corresponding to the video frame instruction to the client, where the rendering instruction includes an identifier of the video frame and a display area.

After sending the video frame instruction to the client, the virtual machine in the server invokes, using the DX runtime library, an interface used for display in the driver display miniport driver of the kernel-mode display driver in the WDDM, instructs the driver to display a specific frame, and attaches a display parameter, including the identifier of the video frame and the display area. The WDDM obtains the display parameter in an interface function pfnPresent. The identifier of the video frame is used to identify a video frame of a to-be-displayed image. The display area is used to indicate an area in a screen on which the to-be-displayed image is displayed. The virtual machine assembles, according to the desktop protocol, the rendering instruction carrying display parameters, such as the identifier of the video frame and the display area, into a network packet, and sends the network packet to the client, so that after receiving the rendering instruction corresponding to the current video frame instruction, the client instructs an instruction execution module to display, in a specified display area on the screen according to the identifier of the video frame and the display area that are carried in the rendering instruction corresponding to the video frame instruction, a video image in the video frame carried in the video frame instruction, and deletes data that is in a data buffer and that is related to the current video frame instruction, so as to receive a next video frame instruction, and display a video image according to a received corresponding rendering instruction.

209. The server sends a decoder destruction instruction to the client after finishing sending the video frame, where the decoder destruction instruction is used to instruct the client to destruct the decoder.

After finishing sending all video frames of the current video, the virtual machine in the server destructs the decoding device to release a corresponding resource of the server end, and sends the decoder destruction instruction to the client, so that the client destructs the decoder after finishing hardware decoding on all the video frames, to release an occupied resource of the client.

It should be noted that similar to the decoder initialization instruction in step 202, the video frame instruction in step 207, the rendering instruction in step 208, and the decoder destruction instruction in step 209 are also mitigated instructions. For a sequence of mitigated instructions sent by the server to the client, refer to FIG. 7. Similar to the decoder initialization instruction, when receiving the video frame instruction in this embodiment of the present disclosure, a client based on any operating system (including a non-Windows operating system and a Windows operating system) may invoke a decoding interface (Decode interface) to perform hardware decoding. Unlike the prior art, the client does not need to receive a group of instructions, and invoke, when receiving the last instruction in the group of instructions, the decode interface to perform hardware decoding. Similarly, when receiving the rendering instruction, the client may invoke a rendering interface (Present interface) for display. When receiving the decoder destruction instruction, the client may invoke a decoder destruction interface (DestroyDecoder interface) to destruct the decoder. Therefore, compared with the prior art in which the server needs to send more than 40 types of instructions (for example, a CreateDevice instruction, a DestroyDevice instruction, a CreateResource instruction, a DestroyResource instruction, a CreateDecodeDevice instruction, a DestroyDecodeDevice instruction, a SetDecodeRenderTarget instruction, a DecodeBeginFrame instruction, a DecodeExcute instruction, a DecodeEndFrame instruction, and a Present instruction) to the client in a multimedia redirection process, in the method provided in this embodiment of the present disclosure, only four types of mitigated instructions need to be sent: the decoder initialization instruction, the video frame instruction, the rendering instruction, and the decoder destruction instruction. Therefore, a quantity of instructions sent by the server to the client may be reduced, and an amount of data sent by the server to the client may be reduced, thereby saving bandwidth.

In this embodiment of the present disclosure, after the client based on the non-Windows operating system converts the hardware decoding capability into the hardware decoding capability in the DXVA specification, the server based on a Windows operating system may recognize the hardware decoding capability in the DXVA specification, and send the non-decoded video data to the client based on the non-Windows operating system. The decoder initialization instruction, the video frame instruction, the rendering instruction, and the decoder destruction instruction are not instructions in a Windows specification, but are general instructions. Therefore, both the client based on the non-Windows operating system and the client based on the Windows operating system can initialize the decoder according to the instruction. The restored video code stream of the standard encoding format is of a general standard encoding format. Both the client based on the non-Windows operating system and the client based on the Windows operating system can recognize the video code stream, and then perform hardware decoding using the decoder and display the video code stream. Therefore, the problem in the prior art that the multimedia redirection technology is not applicable to the client based on the non-Windows operating system is resolved.

Figure 8:
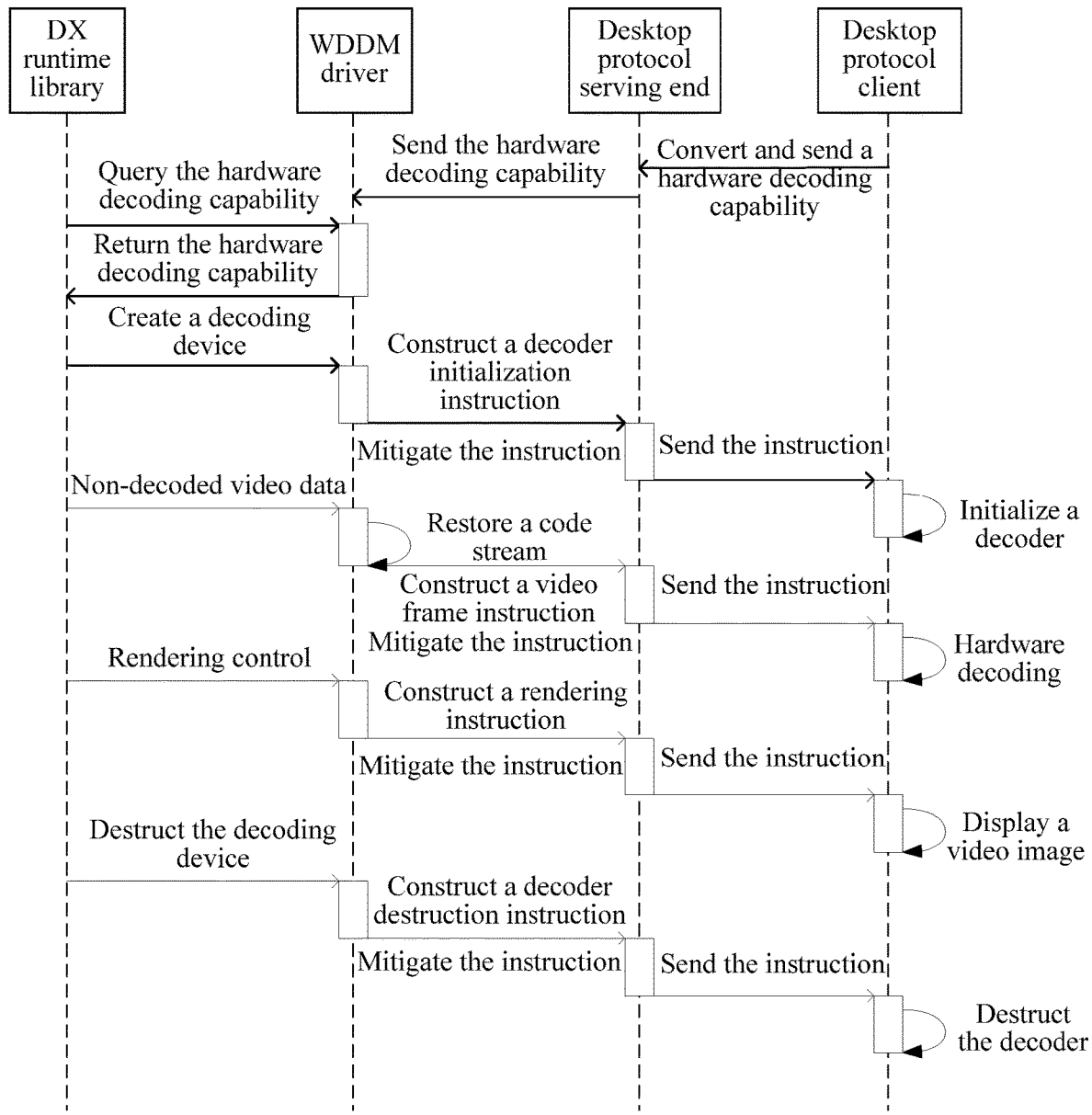
FIG. 8 is a flowchart of interaction between a server and a client according to an embodiment of the present disclosure.

According to the descriptions in steps 201 to 209, for a flowchart of interaction between the server and the client during multimedia redirection provided in this embodiment of the present disclosure, refer to FIG. 8. After converting the hardware decoding capability into the hardware decoding capability in the DXVA specification, the client based on the non-Windows operating system sends the hardware decoding capability in the DXVA specification to a desktop protocol serving end using a desktop protocol client. The server transfers the hardware decoding capability in the DXVA specification to the WDDM driver after receiving, using the desktop protocol serving end, the hardware decoding capability in the DXVA specification that is sent by the client. When playing a video, an application program, such as a player, queries the WDDM driver by invoking the DX runtime library, obtains the hardware decoding capability in the DXVA specification, and then instructs the WDDM to create a decoding device. The WDDM constructs a mitigated decoder initialization instruction, and sends the mitigated decoder initialization instruction to the client using the desktop protocol serving end. The client initializes the decoder after receiving the decoder initialization instruction. Subsequently, the application program fills non-decoded video data into an image buffer and a code stream buffer by invoking the DX runtime library, restores a stream, constructs a mitigated video frame instruction, and sends the mitigated video frame instruction to the client. The client starts performing hardware decoding after receiving the video frame instruction. In addition, the application program controls rendering by invoking the DX runtime library, and transfers a rendering parameter to the WDDM. The WDDM constructs a mitigated rendering instruction according to the rendering parameter, and sends the mitigated rendering instruction to the client. The client displays a video image after receiving the rendering instruction. After finishing sending the video data, the application program instructs, by invoking the DX runtime library, the WDDM to destruct the decoding device. The WDDM constructs a mitigated decoder destruction instruction and sends the mitigated decoder destruction instruction to the client. The client destructs the decoder after receiving the decoder destruction instruction, to finish the current video playing. In addition, for a schematic diagram of interaction between a server and a client during multimedia redirection provided in this embodiment of the present disclosure, refer to FIG. 9. Construction and transmission of the decoder initialization instruction, the video frame instruction, and the decoder destruction instruction may be performed using a line 1. Construction and transmission of the rendering instruction may be performed using a line 2.

This embodiment of the present disclosure provides the multimedia redirection method. When the multimedia file is remotely played using the VDI-based remote desktop technology, after receiving the hardware decoding capability in the DXVA specification that is converted from the hardware decoding capability of the non-Windows operating system and that is sent by the client based on the non-Windows operating system, the virtual machine based on the Windows operating system may recognize the hardware decoding capability in the DXVA specification, and uses the hardware decoding capability in the DXVA specification as a hardware decoding capability of the virtual machine, and therefore, does not perform software decoding on the video data. Instead, the virtual machine restores the non-decoded video data to the video code stream of the standard encoding format, and sends the video code stream to the client actually having the hardware decoding capability, so that the client based on the non-Windows operating system can also decode and display the video code stream of the standard encoding format to implement multimedia redirection. Therefore, the problem in the prior art that the multimedia redirection technology is not applicable to the client based on the non-Windows operating system is resolved.

Referring to FIG. 10, an embodiment of the present disclosure provides a multimedia redirection method. The method may include the following main steps.

301. A client converts a hardware decoding capability of the client into a hardware decoding capability in a video hardware acceleration DXVA specification, where the client includes a non-Windows operating system.

302. The client sends the hardware decoding capability in the DXVA specification to a server.

303. The client receives a video code stream that is of a standard encoding format and that is obtained by restoring video data by the server, and decodes and displays the video code stream.

In step 301, the server may be a server based on a Windows operating system, and may recognize the hardware decoding capability in the DXVA specification. The client may be a client based on a non-Windows operating system. The hardware decoding capability of the client is not a hardware decoding capability in the DXVA specification. After the client converts the hardware decoding capability of the non-Windows operating system into the hardware decoding capability in the video hardware acceleration DXVA specification, the hardware decoding capability can be recognized by a virtual machine based on the Windows operating system. All clients in this embodiment of the present disclosure are clients based on non-Windows operating systems unless otherwise specified.

Optionally, in step 301, that a client of a non-Windows operating system converts a hardware decoding capability of the client into a hardware decoding capability in a video hardware acceleration DXVA specification may include filling, by the client according to a format of a hardware decoding capability at a video bitstream processing VLD level in the DXVA specification, the hardware decoding capability into a structure that describes the hardware decoding capability and that is defined in the DXVA specification.

In step 301 and step 302, for a specific implementation process of converting, by the client, the hardware decoding capability into the hardware decoding capability in the video hardware acceleration DXVA specification and sending the hardware decoding capability in the video hardware acceleration DXVA specification to the server, refer to the specific description in step 201 in the foregoing embodiment, and details are not described herein again.

Optionally, in step 303, that the client receives a video code stream that is of a standard encoding format and that is obtained by restoring video data by the server, and decodes and displays the video code stream may include receiving, by the client, a video frame instruction sent by the server, where the video frame instruction includes decoding parameter information in a structure corresponding to the standard encoding format and a video frame of a video frame sequence, and the decoding parameter information in the structure corresponding to the standard encoding format includes a specification, a profile level, and video resolution that correspond to a code stream of the video data; receiving, by the client, a rendering instruction that is corresponding to the video frame instruction and that is sent by the server, where the rendering instruction includes an identifier of the video frame and a display area; and decoding and displaying, by the client, the video code stream according to the video frame instruction and the rendering instruction.

After receiving the video frame instruction sent by the server, the client decodes the video code stream according to the decoding parameter information corresponding to the standard encoding format, and then displays a video image according to the rendering instruction. For specific descriptions of the video frame instruction and the rendering instruction, refer to step 207 and step 208.

Optionally, the method may further include the following steps.

In step 303, before receiving the restored video code stream that is of the standard encoding format and that is sent by the server, the client may receive a decoder initialization instruction sent by the server. The decoder initialization instruction is used to instruct the client to initialize, according to the decoder initialization instruction, a decoder of the client. After receiving the decoder initialization instruction, the client invokes an initialization interface provided by a hardware chip vendor, so as to initialize the decoder.

Optionally, after finishing decoding, the client may further receive a decoder destruction instruction sent by the server. The decoder destruction instruction is used to instruct the client to destruct the decoder. The client destructs the decoder after finishing hardware decoding on all video frames, to release an occupied resource of the client.

It should be noted that in this embodiment of the present disclosure, the decoder initialization instruction, the video frame instruction, the rendering instruction, and the decoder destruction instruction that are received by the client are mitigated instructions. Compared with the prior art in which the server needs to send more than 40 types of instructions to the client in a multimedia redirection process, in the method provided in this embodiment of the present disclosure, only four types of mitigated instructions need to be sent: the decoder initialization instruction, the video frame instruction, the rendering instruction, and the decoder destruction instruction. Therefore, a quantity of instructions sent by the server to the client may be reduced, thereby saving bandwidth.

In addition, in this embodiment of the present disclosure, after the client converts the hardware decoding capability based on the non-Windows operating system into the hardware decoding capability in the DXVA specification, the server based on the Windows operating system may recognize the hardware decoding capability in the DXVA specification, and send the non-decoded video data to the client based on the non-Windows operating system. The decoder initialization instruction, the video frame instruction, the rendering instruction, and the decoder destruction instruction are not instructions in a Windows specification, but are general instructions. Therefore, both the client based on the non-Windows operating system and a client based on a Windows operating system can initialize a decoder according to the instruction. The restored video code stream of the standard encoding format is of a general standard encoding format. Both the client based on the non-Windows operating system and the client based on the Windows operating system can recognize the video code stream, and then perform hardware decoding using the decoder and display the video code stream. Therefore, a problem in the prior art that a multimedia redirection technology is not applicable to the client based on the non-Windows operating system is resolved.

In addition, if the client does not have the hardware decoding capability, a VLD-level hardware decoding capability may be sent to the virtual machine, so that the virtual machine may not perform software decoding on the video data, and sends the non-decoded video data to the client for decoding, thereby implementing redirection of multimedia data. The client may not perform hardware decoding after receiving the non-decoded video data sent by the virtual machine, but performs software decoding using a CPU of the client. This is not limited in this embodiment of the present disclosure. Certainly, compared with software decoding performed using the CPU, hardware decoding performed using the client achieves a better video playing effect.

It should be noted that according to the method provided in this embodiment of the present disclosure, multimedia redirection of the client based on the non-Windows operating system can be implemented. The client based on the Windows operating system does not need to convert the hardware decoding capability during multimedia redirection, but may also perform stream restoration and instruction mitigation using the method provided in this embodiment of the present disclosure. Therefore, a quantity of instructions sent by the server to the client may be reduced, thereby reducing a bandwidth requirement.

This embodiment of the present disclosure provides the multimedia redirection method. When a multimedia file is played using a VDI-based remote desktop technology, after converting the hardware decoding capability of the client into the hardware decoding capability in the DXVA specification, the client based on the non-Windows operating system sends the hardware decoding capability in the DXVA specification to the server based on the Windows operating system, so that the server can recognize the hardware decoding capability in the DXVA specification, and use the hardware decoding capability in the DXVA specification as a hardware decoding capability of the server, so as to restore the video data, on which software decoding is not performed, to the video code stream of the standard encoding format, and then send the video code stream to the client. The client based on the non-Windows operating system decodes and displays the received video code stream of the standard encoding format to implement multimedia redirection. Therefore, a problem in the prior art that a multimedia redirection technology is not applicable to the client based on the non-Windows operating system is resolved.

Figure 11:
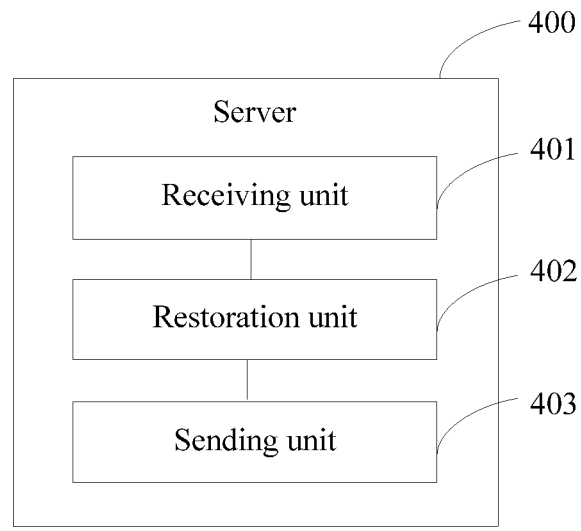
FIG. 11 is a schematic structural diagram of a server according to an embodiment of the present disclosure.

Referring to FIG. 11, an embodiment of the present disclosure provides a server 400. The server 400 may include a receiving unit 401 that may be configured to receive a hardware decoding capability sent by a client, where the hardware decoding capability is a hardware decoding capability that is in a video hardware acceleration DXVA specification and that is converted from a hardware decoding capability of a non-Windows operating system by the client; a restoration unit 402 that may be configured to restore video data to a video code stream of a standard encoding format after the receiving unit 401 receives the hardware decoding capability; and a sending unit 403 that may be configured to send the video code stream to the client for decoding and display.

Optionally, the hardware decoding capability in the DXVA specification may be at a video bitstream processing VLD level.

Optionally, the restoration unit 402 may be configured to obtain, from an image buffer, decoding parameter information needed to decode the video data, where the decoding parameter information includes a specification, a profile level, and video resolution that correspond to a code stream of the video data, and obtain a video frame sequence of the video data from a code stream buffer; fill the decoding parameter information into a structure corresponding to the standard encoding format; and synthesize the video frame sequence with the decoding parameter information in the structure corresponding to the standard encoding format to obtain the video code stream of the standard encoding format.

The server may fill, according to an algorithm specified in a video coding standard corresponding to the standard encoding format, the decoding parameter information into the structure corresponding to the standard encoding format.

Optionally, the sending unit 403 may be configured to send a video frame instruction to the client, where the video frame instruction includes the decoding parameter information in the structure corresponding to the standard encoding format and a video frame of the video frame sequence; and send a rendering instruction corresponding to the video frame instruction to the client, where the rendering instruction includes an identifier of the video frame and a display area.

Figure 12:
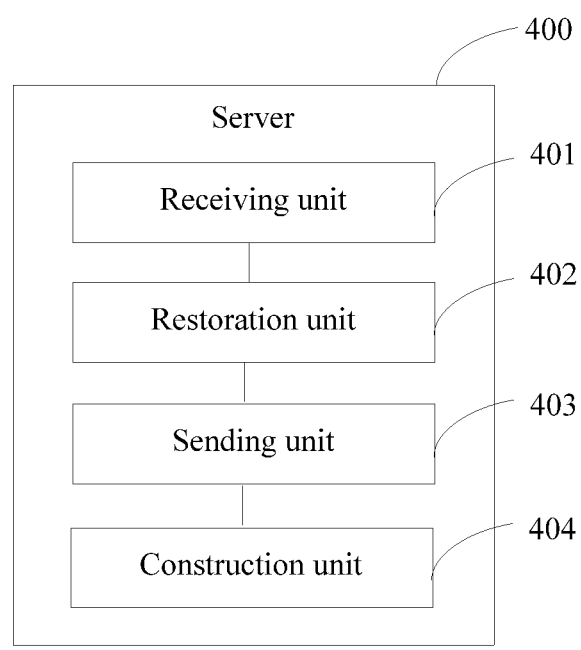
FIG. 12 is a schematic structural diagram of another server according to an embodiment of the present disclosure.

Optionally, referring to FIG. 12, the server 400 may further include a construction unit 404 configured to construct a decoder initialization instruction according to a type of a decoder that needs to be created by the client.

The sending unit 403 may be further configured to send the decoder initialization instruction to the client, where the decoder initialization instruction is used to instruct the client to initialize, according to the decoder initialization instruction, the decoder of the client, to wait to receive the video frame.

Optionally, the sending unit 403 may be further configured to send a decoder destruction instruction to the client after finishing sending the video frame, where the decoder destruction instruction is used to instruct the client to destruct the decoder.

This embodiment of the present disclosure provides the server 400 based on a Windows operating system. When a multimedia file is remotely played using a VDI-based remote desktop technology, after receiving the hardware decoding capability in the DXVA specification that is converted from the hardware decoding capability of the non-Windows operating system and that is sent by the client based on the non-Windows operating system, the server 400 may recognize the hardware decoding capability in the DXVA specification, use the hardware decoding capability in the DXVA specification as a hardware decoding capability of the server 400, and therefore, does not perform software decoding on the video data. Instead, the server 400 restores the non-decoded video data to the video code stream of the standard encoding format, and sends the video code stream to the client actually having the hardware decoding capability, so that the client based on the non-Windows operating system can also decode and display the video code stream of the standard encoding format to implement multimedia redirection. Therefore, a problem in the prior art that a multimedia redirection technology is not applicable to the client based on the non-Windows operating system is resolved.

Figure 13:
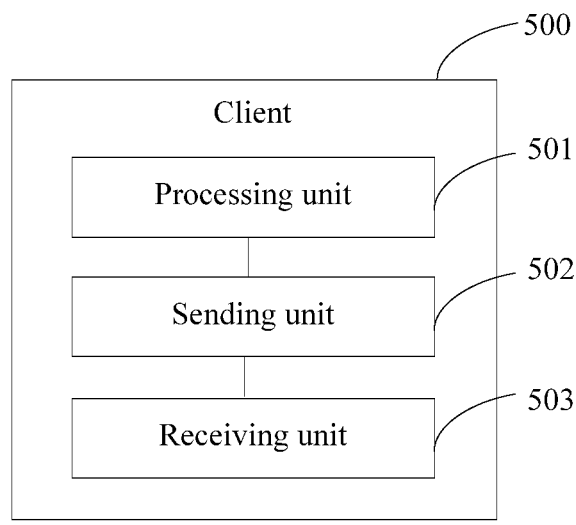
FIG. 13 is a schematic structural diagram of a client according to an embodiment of the present disclosure.

Referring to FIG. 13, an embodiment of the present disclosure provides a client 500. The client 500 may mainly include a processing unit 501 that may be configured to convert a hardware decoding capability of the client 500 into a hardware decoding capability in a video hardware acceleration DXVA specification, where the client 500 includes a non-Windows operating system; a sending unit 502 that may be configured to send the hardware decoding capability in the DXVA specification to a server; and a receiving unit 503 that may be configured to receive a video code stream that is of a standard encoding format and that is obtained by restoring video data by the server.

The processing unit 501 may be further configured to decode and display the video code stream received by the receiving unit 503.

Optionally, the processing unit 501 may be configured to fill, according to a format of a hardware decoding capability at a video bitstream processing VLD level in the DXVA specification, the hardware decoding capability into a structure that describes the hardware decoding capability and that is defined in the DXVA specification.

Optionally, the receiving unit 503 may be configured to receive a video frame instruction sent by the server, where the video frame instruction includes decoding parameter information in a structure corresponding to the standard encoding format and a video frame of a video frame sequence, and the decoding parameter information in the structure corresponding to the standard encoding format includes a specification, a profile level, and video resolution that correspond to a code stream of the video data; and receive a rendering instruction that is corresponding to the video frame instruction and that is sent by the server, where the rendering instruction includes an identifier of the video frame and a display area.

The processing unit 501 may be configured to decode and display the video code stream according to the video frame instruction and the rendering instruction that are received by the receiving unit 503.

Optionally, the receiving unit 503 may be further configured to, before receiving the video code stream, receive a decoder initialization instruction sent by the server, where the decoder initialization instruction is used to instruct the client 500 to initialize, according to the decoder initialization instruction, a decoder of the client 500; and after finishing decoding, receive a decoder destruction instruction sent by the server, where the decoder destruction instruction is used to instruct the client 500 to destruct the decoder.

This embodiment of the present disclosure provides the client 500 based on the non-Windows operating system. When a multimedia file is played using a VDI-based remote desktop technology, after converting the hardware decoding capability of the client 500 into the hardware decoding capability in the DXVA specification, the client 500 sends the hardware decoding capability in the DXVA specification to the server based on a Windows operating system, so that the server can recognize the hardware decoding capability in the DXVA specification, and use the hardware decoding capability in the DXVA specification as a hardware decoding capability of the server, so as to restore the video data on which software decoding is not performed to the video code stream of the standard encoding format, and then send the video code stream to the client 500. The client 500 based on the non-Windows operating system decodes and displays the received video code stream of the standard encoding format to implement multimedia redirection. Therefore, a problem in the prior art that a multimedia redirection technology is not applicable to the client 500 based on the non-Windows operating system is resolved.

Figure 14:
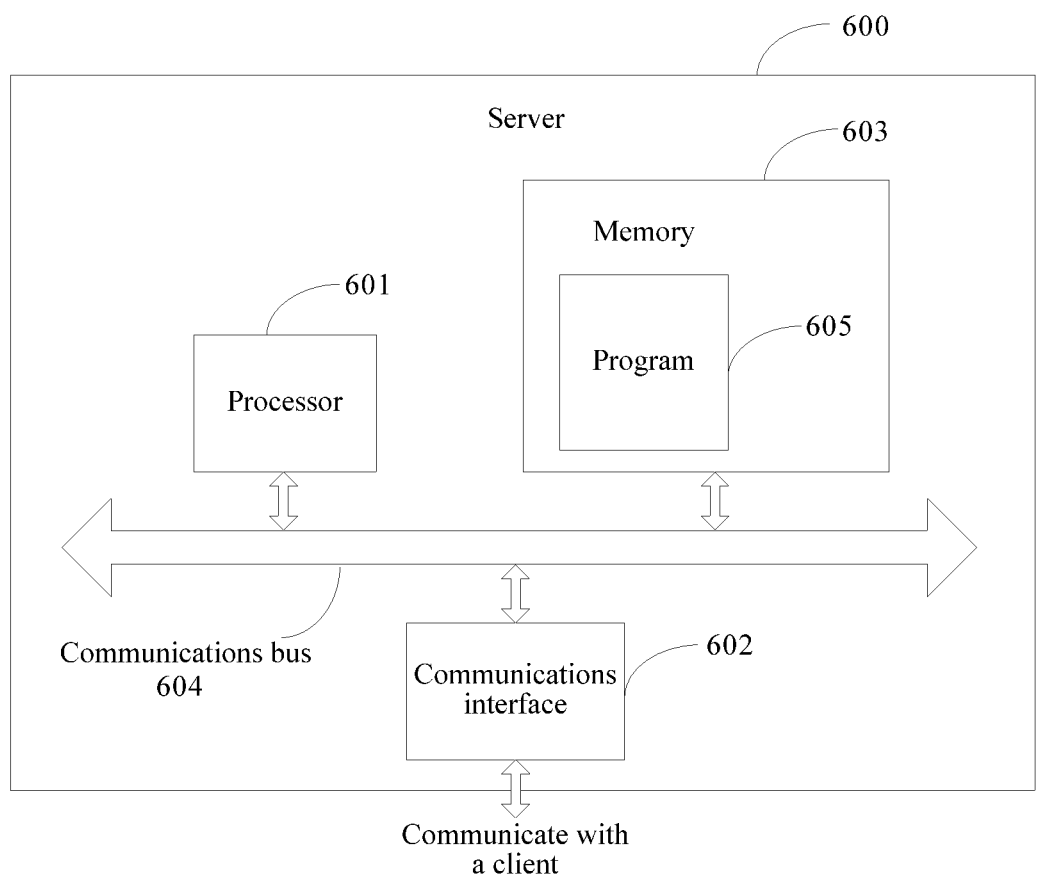
FIG. 14 is a schematic structural diagram of a server according to another embodiment of the present disclosure.

FIG. 14 is a schematic structural diagram of a server 600 according to an embodiment of the present disclosure. The server 600 may include a processor 601, a communications interface 602, a memory 603, and a communications bus 604.

The processor 601, the communications interface 602, and the memory 603 communicate with each other using the communications bus 604.

The communications interface 602 is configured to communicate with a network element such as a client.

The processor 601 is configured to execute a program 605, and may execute related steps in the method embodiments shown in FIG. 3 and FIG. 4.

The program 605 may include program code. The program code includes a computer operation instruction.

The processor 601 may be a CPU or an application-specific integrated circuit (ASIC), or may be one or more integrated circuits configured to implement the embodiments of the present disclosure.

The memory 603 is configured to store the program 605. The memory 603 may include a high-speed random access memory (RAM), and may further include a non-volatile memory, for example, at least one magnetic disk storage. The program 605 may include receiving a hardware decoding capability sent by a client, where the hardware decoding capability is a hardware decoding capability that is in a video hardware acceleration DXVA specification and that is converted from a hardware decoding capability of a non-Windows operating system by the client; restoring video data to a video code stream of a standard encoding format after receiving the hardware decoding capability; and sending the video code stream to the client for decoding and display.

Modules in the program 605 may include the following.

Optionally, the hardware decoding capability in the DXVA specification may be at a video bitstream processing VLD level.

Optionally, the restoring video data to a video code stream of a standard encoding format may include obtaining, from an image buffer, decoding parameter information needed to decode the video data, where the decoding parameter information includes a specification, a profile level, and video resolution that correspond to a code stream of the video data, and obtaining a video frame sequence of the video data from a code stream buffer; filling the decoding parameter information into a structure corresponding to the standard encoding format; and synthesizing the video frame sequence with the decoding parameter information in the structure corresponding to the standard encoding format to obtain the video code stream of the standard encoding format.

Optionally, the sending the video code stream to the client for decoding and display may include sending a video frame instruction to the client, where the video frame instruction includes the decoding parameter information in the structure corresponding to the standard encoding format and a video frame of the video frame sequence; and sending a rendering instruction corresponding to the video frame instruction to the client, where the rendering instruction includes an identifier of the video frame and a display area.

Optionally, before the restoring video data to a video code stream of a standard encoding format, the program 605 may further include constructing a decoder initialization instruction according to a type of a decoder that needs to be created by the client; and sending the decoder initialization instruction to the client, where the decoder initialization instruction is used to instruct the client to initialize, according to the decoder initialization instruction, the decoder of the client, to wait to receive the video frame.

Optionally, the program 605 may further include sending a decoder destruction instruction to the client after finishing sending the video frame, where the decoder destruction instruction is used to instruct the client to destruct the decoder.

This embodiment of the present disclosure provides the server 600 based on a Windows operating system. When a multimedia file is remotely played using a VDI-based remote desktop technology, after receiving the hardware decoding capability in the DXVA specification that is converted from the hardware decoding capability of the non-Windows operating system and that is sent by the client based on the non-Windows operating system, the server 600 may recognize the hardware decoding capability in the DXVA specification, use the hardware decoding capability in the DXVA specification as a hardware decoding capability of the server 600, and therefore, does not perform software decoding on the video data. Instead, the server 600 restores the non-decoded video data to the video code stream of the standard encoding format, and sends the video code stream to the client actually having the hardware decoding capability, so that the client based on the non-Windows operating system can also decode and display the video code stream of the standard encoding format to implement multimedia redirection. Therefore, a problem in the prior art that a multimedia redirection technology is not applicable to the client based on the non-Windows operating system is resolved.

Figure 15:
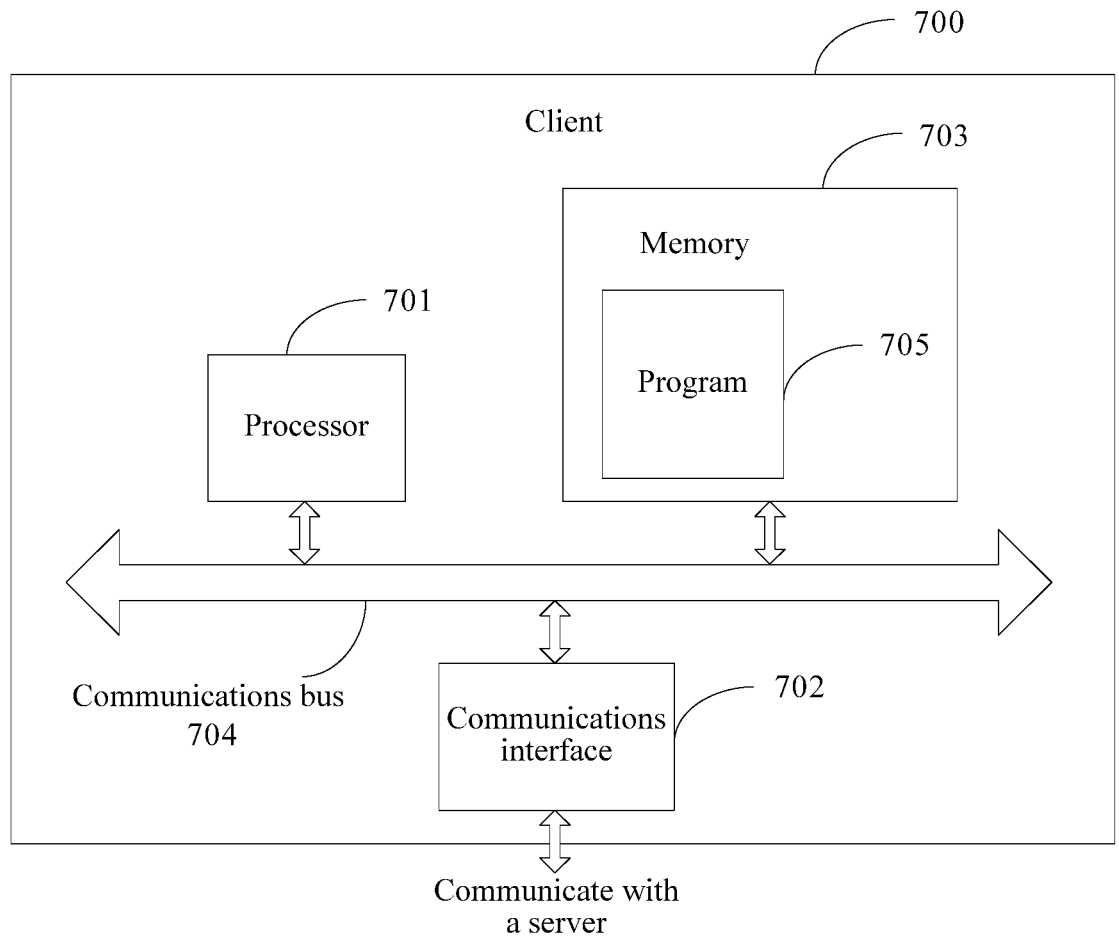
FIG. 15 is a schematic structural diagram of a client according to another embodiment of the present disclosure.

FIG. 15 is a schematic structural diagram of another client 700 according to an embodiment of the present disclosure. The client 700 may include a processor 701, a communications interface 702, a memory 703, and a communications bus 704.

The processor 701, the communications interface 702, and the memory 703 communicate with each other using the communications bus 704.

The communications interface 702 is configured to communicate with a network element such as a server.

The processor 701 is configured to execute a program 705, and may execute related steps in the method embodiment shown in FIG. 10.

The program 705 may include program code. The program code includes a computer operation instruction.

The processor 701 may be a CPU or an ASIC, or may be one or more integrated circuits configured to implement the embodiments of the present disclosure.

The memory 703 is configured to store the program 705. The memory 703 may include a high-speed RAM, and may further include a non-volatile memory, for example, at least one magnetic disk storage. The program 705 may include converting a hardware decoding capability of the client 700 into a hardware decoding capability in a video hardware acceleration DXVA specification, where the client 700 includes a non-Windows operating system; sending the hardware decoding capability in the DXVA specification to a server; and receiving a video code stream that is of a standard encoding format and that is obtained by restoring video data by the server, and decoding and displaying the video code stream.

Modules in the program 705 may include the following.

Optionally, the converting a hardware decoding capability of the client 700 into a hardware decoding capability in a video hardware acceleration DXVA specification may include filling, according to a format of a hardware decoding capability at a video bitstream processing VLD level in the DXVA specification, the hardware decoding capability into a structure that describes the hardware decoding capability and that is defined in the DXVA specification.

Optionally, the receiving a video code stream that is of a standard encoding format and that is obtained by restoring video data by the server, and decoding and displaying the video code stream may include receiving a video frame instruction sent by the server, where the video frame instruction includes decoding parameter information in a structure corresponding to the standard encoding format and a video frame of a video frame sequence, and the decoding parameter information in the structure corresponding to the standard encoding format includes a specification, a profile level, and video resolution that correspond to a code stream of the video data; receiving a rendering instruction that is corresponding to the video frame instruction and that is sent by the server, where the rendering instruction includes an identifier of the video frame and a display area; and decoding and displaying the video code stream according to the video frame instruction and the rendering instruction.

Optionally, the program may further include, before receiving the video code stream, receiving a decoder initialization instruction sent by the server, where the decoder initialization instruction is used to instruct the client 700 to initialize, according to the decoder initialization instruction, a decoder of the client 700; and after finishing decoding, receiving a decoder destruction instruction sent by the server, where the decoder destruction instruction is used to instruct the client 700 to destruct the decoder.

This embodiment of the present disclosure provides the client 700 based on the non-Windows operating system. When a multimedia file is played using a VDI-based remote desktop technology, after converting the hardware decoding capability of the client 700 into the hardware decoding capability in the DXVA specification, the client 700 sends the hardware decoding capability in the DXVA specification to the server based on a Windows operating system, so that the server can recognize the hardware decoding capability in the DXVA specification, and use the hardware decoding capability in the DXVA specification as a hardware decoding capability of the server, so as to restore the video data on which software decoding is not performed to the video code stream of the standard encoding format, and then send the video code stream to the client 700. The client 700 based on the non-Windows operating system decodes and displays the received video code stream of the standard encoding format to implement multimedia redirection. Therefore, a problem in the prior art that a multimedia redirection technology is not applicable to the client 700 based on the non-Windows operating system is resolved.

Figure 16:
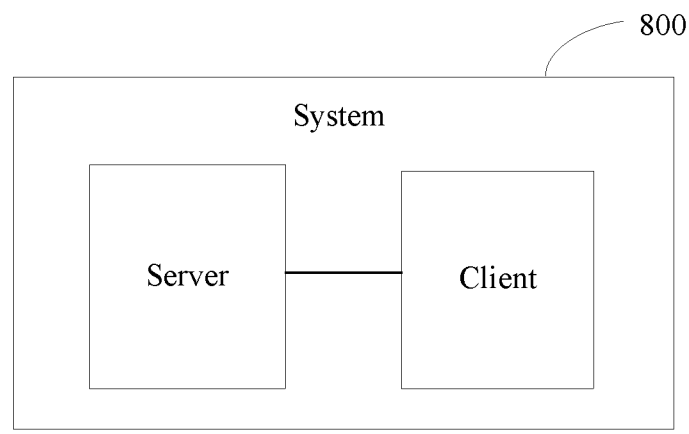
FIG. 16 is a schematic structural diagram of a system according to an embodiment of the present disclosure.

An embodiment of the present disclosure provides a system 800. For a schematic structural diagram of the system 800, refer to FIG. 16. The system 800 may include the server shown in FIG. 11, FIG. 12, or FIG. 14 and the client shown in FIG. 13 or FIG. 15. For specific implementations of the server and the client, refer to the descriptions of the foregoing embodiments.

In the several embodiments provided in this application, it should be understood that the disclosed system, device, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separated, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware and a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A multimedia redirection method, comprising: receiving, by a server, a hardware decoding capability *seat-from a client device, wherein the hardware decoding capability is in a video hardware acceleration specification, wherein the hardware decoding capability is converted from a hardware decoding capability of an operating system by the client device, and wherein the hardware decoding capability of die operating system Is not a hardware decoding capability in the video hardware acceleration specification;
   restoring, by the server, video data to a video code stream of a standard encoding format after receiving the hardware decoding capability; and
   sending, by the server, the video code stream to the client device;
   wherein restoring video data to the video code stream of the standard encoding format comprises:
   obtaining, by the server from an image buffer, decoding parameter information used to decode the video data, wherein the decoding parameter information comprises a specification, a profile level, and video resolution that correspond to a code stream of the video data;
   obtaining, by the server, a video frame sequence of the video data from a code stream buffer;
   filling, by the server, the decoding parameter information into a structure corresponding to the standard encoding format; and
   synthesizing, by the server, the video frame sequence with the decoding parameter information in the structure corresponding to the standard encoding format to obtain the video code stream of the standard encoding format.

2. The method according to claim 1, wherein the hardware decoding capability in the video hardware acceleration specification is at a video bitstream processing level.

3. The method according to claim 1, wherein sending, by the server, the video code stream to the client device for decoding and display comprises:
   sending, by the server, a video frame instruction to the client device, wherein the video frame instruction comprises the decoding parameter information in the structure corresponding to the standard encoding format and a video frame of the video frame sequence; and
   sending, by the server, a rendering instruction corresponding to the video frame instruction to the client device, wherein the rendering instruction comprises an identifier of the video frame and a display area.

4. The method according to claim 1, wherein before restoring, by the server, video data to the video code stream of the standard encoding format, the method further comprises:
   constructing, by the server, a decoder initialization instruction according to a type of a decoder that use to be created by the client device; and
   sending, by the server, the decoder initialization instruction to the client device, wherein the decoder initialization instruction is used to instruct the client device to initialize, according to the decoder initialization instruction, the decoder of the client device.

5. The method according to claim 4, further comprising sending, by the server, a video frame to the client device; and
   sending, by the server, a decoder destruction instruction to the client device, wherein the decoder destruction instruction is used to instruct the client device to destruct the decoder.

6. A multimedia redirection method, comprising: converting, by a client device, a hardware decoding capability of the client device into a hardware decoding capability in a video hardware acceleration specification, wherein the client device comprises an operating system, wherein the hardware decoding capability of the operating system is not a hardware decoding capability in the video hardware acceleration specification;

sending, by the client device, the hardware decoding capability in the video hardware acceleration specification to a server;
receiving, by the client device, a video code stream of a standard encoding format and obtained by restoring video data by the server;
creating, by the client device, a decoder based on the hardware decoding capability in the video hardware acceleration specification;
decoding by the client device, the video code stream;
displaying, by the client device, the decoded video code stream;
wherein receiving, by the client device, the video code stream of the standard encoding format and obtained by restoring video data by the server, and decoding and displaying the video code stream comprises:
receiving, by the client device, a video frame instruction seat-fey from the server;
wherein the video frame instruction comprises decoding parameter information in a structure corresponding to the standard encoding format and a video frame of a video frame sequence, and wherein the decoding parameter information in the structure corresponding to the standard encoding format comprises a specification, a profile level;
and video resolution that correspond to a code stream of the video data;
receiving, by the client device, a rendering instruction corresponding to the video frame instruction and from the server, wherein the rendering instruction comprises an identifier of the video frame and a display area;
decoding, by the client device, the video code stream according to the video frame instruction and the rendering instruction; and
displaying, by the client device, the decoded video code stream.

7. The method according to claim 6, wherein converting, by the client device, the hardware decoding capability of the client device into the hardware decoding capability in the video hardware acceleration specification comprises filling, by the client device according to a format of a hardware decoding capability at a video bitstream processing level in the video hardware acceleration specification, the hardware decoding capability into a structure that describes the hardware decoding capability, wherein the structure is defined in the video hardware acceleration specification.

8. The method according to claim 6, further comprising: receiving, by the client device, a decoder initialization instruction from the server, wherein the decoder initialization instruction is used to instruct the client device to initialize, according to the decoder initialization instruction, the decoder of the client device; and receiving, by the client device, a decoder destruction instruction from the server, wherein the decoder destruction instruction is used to instruct the client device to destruct the decoder.

9. A server comprising:
a memory storing a program of executable instructions; and a processor coupled to the memory and configured to execute the program in the memory to:
receive a hardware decoding capability from a client device, wherein the hardware decoding capability is in a video hardware acceleration specification and, wherein the hardware decoding capability is converted from a hardware decoding capability of an operating system by the client device, and wherein the hardware decoding capability of the operating, system is not a hardware decoding capability in the video hardware acceleration specification;
restore video data to a video code stream of a standard encoding format after receiving the hardware decoding capability; and
send the video code stream to the client device;
wherein the processor is further configured to:
obtain, from an image buffer, decoding parameter information needed to decode the video data, wherein the decoding parameter information comprises a specification, a profile level, and video resolution that correspond to a code stream of the video data;
obtain a video frame sequence of the video data from a code stream buffer; fill the decoding parameter information into a structure corresponding to the standard encoding format; and
synthesize the video frame sequence with the decoding parameter information in the structure corresponding to the standard encoding format to obtain the video code stream of the standard encoding format.

10. The server according to claim 9, wherein the hardware decoding capability in the video hardware acceleration specification is at a video bitstream processing level.

11. The server according to claim 9, wherein the processor is further configured to: send a video frame instruction to the client device, wherein the video frame instruction comprises the decoding parameter information in the structure corresponding to the standard encoding format and a video frame of the video frame sequence; and send a rendering instruction corresponding to the video frame instruction to the client device, wherein the rendering instruction comprises an identifier of the video frame and a display area.

12. The server according to claim 9, wherein the processor is further configured to:
construct a decoder initialization instruction according to a type of a decoder that is created by the client device; and
send the decoder initialization instruction to the client device, wherein the decoder initialization instruction instructs the client device to initialize, according to the decoder initialization instruction, the decoder of the client device.

13. The server according to claim 12, wherein the processor is further configured to:
send a video frame to the client device; and
send a decoder destruction instruction to the client device, and wherein the decoder destruction instruction is used to instruct the client device to destruct the decoder.

14. A client device comprising:
a memory storing a program of executable instructions; and
a processor coupled to the memory and configured to execute program in the memory to:
convert a hardware decoding capability of the client device into a hardware decoding capability in a video hardware acceleration specification, wherein the client device comprises an operating system, and wherein die hardware decoding capability of the operating system is not a hardware decoding capability In the video hardware acceleration specification;
send the hardware decoding capability in the video hardware acceleration specification to a server;
receive a video code stream of a standard encoding format and obtained by restoring video data by the server;
create a decoder based on the hardware decoding capability in die video hardware acceleration specification;

decode the video code stream; and display the decoded video code stream' wherein the processor is further configured to:

receive a video frame instruction four the server, wherein the video frame instruction comprises decoding parameter information in a structure corresponding to the standard encoding format and a video frame of a video frame sequence, and wherein the decoding parameter information in the structure corresponding to the standard encoding format comprises a specification, a profile level, and video resolution that correspond to a code stream of the video data;

receive a rendering instruction corresponding to the video frame instruction and sent from the server, wherein the rendering instruction comprises an identifier of the video frame and a display area;

decode the video code stream according to the video frame instruction and the rendering instruction; and display the decoded video code stream.

15. The client device according to claim 14, wherein the processor is further configured to fill, according to a format of a hardware decoding capability at a video bitstream processing level in the video hardware acceleration specification, the hardware decoding capability into a structure that describes the hardware decoding capability, wherein the structure is defined in the video hardware acceleration specification.

16. The client device according to claim 14, wherein the processor is further configured to:

receive a decoder initialization instruction from the server, wherein the decoder initialization instruction instructs the client device to initialize, according to the decoder initialization instruction, the decoder of the client device; and receive a decoder destruction instruction from the server, wherein the decoder destruction instruction is used to instruct the client device to destruct the decoder.

* * * * *

UNITED STATES PATENT AND TRADEMARK OFFICE
CERTIFICATE OF CORRECTION

| | |
|---|---|
| PATENT NO. | : 10,542,301 B2 |
| APPLICATION NO. | : 15/704266 |
| DATED | : January 21, 2020 |
| INVENTOR(S) | : Chong Chen and Yanping Meng |

It is certified that error appears in the above-identified patent and that said Letters Patent is hereby corrected as shown below:

In the Claims

Claim 6, Column 27, Line 18: "from the server;" should read "from the server,"

Claim 6, Column 27, Line 25: "a profile level;" should read "a profile level,"

Claim 14, Column 29, Line 2: "video code stream' wherein" should read "video code stream, wherein"

Claim 14, Column 29, Line 4: "instruction four the server," should read "instruction for the server,"

Signed and Sealed this
Seventeenth Day of March, 2020

Andrei Iancu
*Director of the United States Patent and Trademark Office*